United States Patent
Iwamura

(10) Patent No.: US 11,671,565 B2
(45) Date of Patent: Jun. 6, 2023

(54) IMAGE PROCESSING SYSTEM, IMAGE PROCESSING DEVICE, IMAGE PROCESSING METHOD, AND NON-TRANSITORY COMPUTER READABLE MEDIUM STORING PROGRAM

(71) Applicant: OMRON Corporation, Kyoto (JP)

(72) Inventor: Shintaro Iwamura, Otsu (JP)

(73) Assignee: OMRON Corporation, Kyoto (JP)

( * ) Notice: Subject to any disclaimer, the term of this patent is extended or adjusted under 35 U.S.C. 154(b) by 294 days.

(21) Appl. No.: 17/267,011

(22) PCT Filed: Sep. 18, 2019

(86) PCT No.: PCT/JP2019/036501
§ 371 (c)(1),
(2) Date: Feb. 8, 2021

(87) PCT Pub. No.: WO2020/066777
PCT Pub. Date: Apr. 2, 2020

(65) Prior Publication Data
US 2021/0312218 A1  Oct. 7, 2021

(30) Foreign Application Priority Data
Sep. 26, 2018 (JP) .............................. JP2018-180812

(51) Int. Cl.
G06K 9/68 (2006.01)
H04N 7/18 (2006.01)
G06T 7/00 (2017.01)

(52) U.S. Cl.
CPC ............. *H04N 7/183* (2013.01); *G06T 7/001* (2013.01)

(58) Field of Classification Search
CPC ........... G06T 7/001; G06T 2207/30164; G06T 2207/30168; G06T 1/0007; G06T 5/001;
(Continued)

(56) References Cited

U.S. PATENT DOCUMENTS 6,701,011 B1 * 3/2004 Nakajima ............... H04N 1/407
345/589
2010/0226561 A1 * 9/2010 Fujikawa .............. G06T 7/0004
382/141
(Continued)

FOREIGN PATENT DOCUMENTS

| CN | 105142493 | 12/2015 |
| CN | 106102555 | 11/2016 |
| CN | 107026973 | 8/2017 |

(Continued)

OTHER PUBLICATIONS

"Office Action of China Counterpart Application", dated Dec. 5, 2022, with English translation thereof, pp. 1-12.
(Continued)

*Primary Examiner* — Samir A Ahmed
(74) *Attorney, Agent, or Firm* — JCIPRNET

(57) ABSTRACT

Provided is an image with which it is possible for a user to discern at a glance a difference in setting values used for image processing and image processing results depending on the difference in the setting values. An image processing system generates a display image in which a first display image including a first setting value group and a first image processing result is associated with a second display image including a second setting value group and a second image processing result. The image display system generates a display image in which a display mode of at least one of setting items corresponding to the setting values varying in value according to a comparison result is different from a display mode of others.

20 Claims, 13 Drawing Sheets

(58) Field of Classification Search
CPC ........... G06T 5/50; G06T 7/0004; G06T 7/13; H04N 23/63; H04N 23/667; H04N 23/90
See application file for complete search history.

(56) References Cited

U.S. PATENT DOCUMENTS

| | | | |
|---|---|---|---|
| 2014/0093172 A1* | 4/2014 | Tonogai | G06V 30/224 382/182 |
| 2016/0048637 A1* | 2/2016 | Nishiyama | A61B 1/0002 382/305 |
| 2016/0234429 A1* | 8/2016 | Cho | H04N 23/62 |
| 2017/0006271 A1* | 1/2017 | Koizumi | G06T 5/001 |
| 2017/0221244 A1* | 8/2017 | Hiraga | G06T 11/60 |
| 2018/0007260 A1 | 1/2018 | Fukui | |
| 2018/0068433 A1* | 3/2018 | Imakoga | G06T 7/0006 |
| 2018/0101294 A1* | 4/2018 | Kuroda | G06F 11/3688 |

FOREIGN PATENT DOCUMENTS

| | | |
|---|---|---|
| CN | 107918584 | 4/2018 |
| JP | H1132227 | 2/1999 |
| JP | 2003284705 | 10/2003 |
| JP | 2004227402 | 8/2004 |
| JP | 2006115468 | 4/2006 |
| JP | 2010191939 | 9/2010 |
| JP | 2011109507 | 6/2011 |
| JP | 2014071698 | 4/2014 |
| JP | 2016146143 | 8/2016 |

OTHER PUBLICATIONS

"International Search Report (Form PCT/ISA/210) of PCT/JP2019/036501", dated Nov. 19, 2019, with English translation thereof, pp. 1-4.

"Written Opinion of the International Searching Authority (Form PCT/ISA/237) of PCT/JP2019/036501", dated Nov. 19, 2019, with English translation thereof, pp. 1-6.

"Search Report of Europe Counterpart Application", dated May 18, 2022, p. 1-p. 9.

* cited by examiner

IMAGE PROCESSING SYSTEM, IMAGE PROCESSING DEVICE, IMAGE PROCESSING METHOD, AND NON-TRANSITORY COMPUTER READABLE MEDIUM STORING PROGRAM

CROSS-REFERENCE TO RELATED APPLICATION

This application is a 371 application of the International PCT application serial no. PCT/JP2019/036501, filed on Sep. 18, 2019, which claims the priority benefits of Japan Patent Application No. 2018-180812, filed on Sep. 26, 2018. The entirety of each of the above-mentioned patent applications is hereby incorporated by reference herein and made a part of this specification.

BACKGROUND

Technical Field

The present invention relates to a technique of image processing according to settings in an image processing device.

Related Art

At a production site using factory automation (FA), an image processing device displays a recognition result of an input image obtained by imaging a workpiece or the like on a display. More specifically, the image processing device executes image processing according to a setting value group consisting of a set of setting values associated with setting items of image processing. The display displays, for example, an image processing result and the setting value group associated with the setting items. As for image processing using an image processing device, Japanese Patent Laid-Open No. 2016-146143 (Patent literature 1) discloses that an image processing device performs main photographing using preset main photographing parameters, and performs main image processing on the photographed image data; the image processing device performs sub-photographing using at least one sub-photographing parameter different from the main photographing parameter during image processing, performs sub-image processing on the sub-photographed image data, and extracts the result; and if the extracted sub-image processing result is appropriate, the image processing device adjusts the sub-photographing parameters that brought about the processing result as the main photographing parameters.

LITERATURE OF RELATED ART

Patent Literature

Patent literature 1: Japanese Patent Laid-Open No. 2016-146143

SUMMARY

Problems to be Solved

Meanwhile, when the image processing device receives a change of a setting value corresponding to a setting item of a plurality of setting items concerning image processing, the result of image processing may change significantly compared with the result before changing the setting value. A user repeatedly changes the setting values by trial and error in order to obtain a desired image processing result. When repeatedly changing the setting values by trial and error, the user may not be able to remember what setting values has been tried. As a technique for saving the changed setting values, a management system is known in which each of the setting value groups corresponding to the setting items is held in association with attribute information. According to the management system, a plurality of setting value groups including the changed setting values can be held. However, even if the setting value group associated with the attribute information is held by the management system, it is difficult for the user to discern at a glance a difference in the setting values corresponding to the same setting item and image processing results depending on the difference in the setting values in a setting value group associated with one attribute information and a setting value group associated with another attribute information. Therefore, there is a need for a technique for providing an image with which it is possible for a user to discern at a glance a difference in setting values used for image processing and image processing results depending on the difference in the setting values.

Disclosed is a technique for providing an image with which it is possible for a user to discern at a glance a difference in setting values used for image processing and image processing results depending on the difference in the setting values.

Means to Solve Problems

According to an aspect of the present invention, there is provided an image processing system for performing image processing on an input image according to settings. The image processing system includes: a management server that holds each setting value group in association with attribute information, the setting value group consisting of a set of setting values being values used for the settings and corresponding to a plurality of setting items; and an image processing device capable of communicating with the management server. The image processing device includes an acquisition unit for acquiring a first setting value group and a second setting value group among a plurality of the setting value groups, a reception unit for receiving the input image, an image processing unit for deriving a first image processing result showing the result of performing the image processing on the input image according to the first setting value group and a second image processing result showing the result of performing the image processing on the input image according to the second setting value group, a comparison unit for calculating a comparison result obtained by comparing the setting values corresponding to the same setting item among the setting values included in the first setting value group and the setting values included in the second setting value group, and a display image generation unit for generating a display image in which a first display image including the first setting value group and the first image processing result is associated with a second display image including the second setting value group and the second image processing result. The display image generation unit generates a display image in which a display mode of at least one of the setting values varying in value according to the comparison result and setting items corresponding to the setting values varying in value according to the comparison result is different from a display mode of others.

According to this configuration, an image can be provided with which it is possible for a user to discern at a glance a difference in setting values used for image processing and image processing results depending on the difference in the setting values.

According to another aspect of the present invention, there is provided an image processing device for performing image processing on an input image according to settings. The image processing device includes: an acquisition unit for acquiring a first setting value group and a second setting value group among a plurality of setting value groups from a management server that holds each setting value group in association with attribute information, the setting value group consisting of a set of setting values being values used for the settings and corresponding to a plurality of setting items; a reception unit for receiving the input image; an image processing unit for deriving a first image processing result showing the result of performing the image processing on the input image according to the first setting value group and a second image processing result showing the result of performing the image processing on the input image according to the second setting value group; a comparison unit for calculating a comparison result obtained by comparing the setting values corresponding to the same setting item among the setting values included in the first setting value group and the setting values included in the second setting value group; and a display image generation unit for generating a display image in which a first display image including the first setting value group and the first image processing result is associated with a second display image including the second setting value group and the second image processing result. The display image generation unit generates a display image in which a display mode of at least one of the setting values varying in value according to the comparison result and setting items corresponding to the setting values varying in value according to the comparison result is different from a display mode of others.

The display image generation unit may generate a display image in which the first display image and the second display image are arranged adjacent to each other on the left and right sides. According to this configuration, the image processing device can provide the user with an image that enables comparison between the image processing result and the setting values included in the first display image and the image processing result and the setting values included in the second display image while confirming each setting item.

The display image generation unit may generate a display image in which the first display image and the second display image are arranged adjacent to each other on the left and right sides. In the first display image, the first image processing result is arranged at a position farthest from the second display image, the first setting value group is arranged at a position adjacent to the second display image, and the setting items are arranged between the first image processing result and the first setting value group. In the second display image, the second setting value group is arranged at a position farthest from the first display image, the second image processing result is arranged at a position adjacent to the first display image, and the setting items are arranged between the second image processing result and the second setting value group. According to this configuration, the image processing system can provide an image that allows the user to confirm a difference between the setting values included in the first setting value group and the setting values included in the second setting value group while comparing the image processing result included in the first display image with the image processing result included in the second display image.

The display image generation unit may generate a display image in which the setting items are arranged at substantially the center of the display image, the first setting value group is arranged at a position adjacent to one of the left and right sides with respect to the setting items, and the second setting value group is arranged at a position adjacent to the other side. According to this configuration, the image processing device can expand the display region of the first image processing result and the second image processing result in the display image of a predetermined size, and thus can provide an image that allows the user to confirm the processing result in more detail than before the expansion of the display region.

The display image generation unit may generate a display image in which the first display image is superimposed on the second display image. According to this configuration, the image processing device can provide an image that more clearly shows a difference in the setting values in the image processing for recognizing the shape or the like of the object included in the display image and a difference in the image processing results depending on the difference in the setting values.

The setting values included in the first setting value group and the setting values included in the second setting value group may be changeable. According to this configuration, the image processing device can provide a display image that allows the user to compare the setting values before the change and the setting values after the change in the image processing.

The image processing device may further include a communication unit for outputting the setting value group to the management server. The communication unit may output, to the management server, at least one of the first setting value group in which the setting value is changed and the second setting value group in which the setting value is changed. According to this configuration, the image processing device can reliably save the information of the setting value group of the latest version and the setting value group of the old version.

The image processing unit may derive the first image processing result and the second image processing result by image processing on the same input image. According to this configuration, the image processing device can generate an image that clearly shows a difference in image processing results depending on different setting value groups for the same input image.

The image processing device may further include a storage device for storing the input image. The image processing unit may perform image processing on either an input image photographed by a camera in real time or an input image stored in the storage device. According to this configuration, the image processing device can execute image processing at an arbitrary timing and can improve user convenience.

The image processing device may further include a preprocessing execution unit for executing arbitrary preprocessing on at least one of the input image that has not been subjected to the image processing according to the first setting value group and the input image that has not been subjected to the image processing according to the second setting value group. According to this configuration, the image processing device can remove noise added to the image by filtering the input image.

According to a further aspect of the present invention, there is provided an image processing method for performing image processing on an input image according to settings. The image processing method includes: a step of acquiring a first setting value group and a second setting value group among a plurality of setting value groups from a management server that holds each setting value group in association with attribute information, wherein the setting value group consists of a set of setting values being values used for the settings and corresponding to a plurality of setting items; a step of receiving the input image; a step of deriving a first image processing result showing the result of performing the image processing on the input image according to the first setting value group and a second image processing result showing the result of performing the image processing on the input image according to the second setting value group; a step of calculating a comparison result obtained by comparing the setting values corresponding to the same setting item among the setting values included in the first setting value group and the setting values included in the second setting value group; and a step of generating a display image in which a first display image including the first setting value group and the first image processing result is associated with a second display image including the second setting value group and the second image processing result. The step of generating the display image includes a step of generating a display image in which a display mode of at least one of the setting values varying in value according to the comparison result and setting items corresponding to the setting values varying in value according to the comparison result is different from a display mode of others.

According to still another aspect of the present invention, there is provided a non-transitory computer readable medium storing an image processing program of an image processing device for performing image processing on an input image according to settings. The image processing program causes a control device arranged in the image processing device to execute: a step of acquiring a first setting value group and a second setting value group among a plurality of setting value groups from a management server that holds each setting value group in association with attribute information, wherein the setting value group consists of a set of setting values being values used for the settings and corresponding to a plurality of setting items; a step of receiving the input image; a step of deriving a first image processing result showing the result of performing the image processing on the input image according to the first setting value group and a second image processing result showing the result of performing the image processing on the input image according to the second setting value group; a step of calculating a comparison result obtained by comparing the setting values corresponding to the same setting item among the setting values included in the first setting value group and the setting values included in the second setting value group; and a step of generating a display image in which a first display image including the first setting value group and the first image processing result is associated with a second display image including the second setting value group and the second image processing result. The step of generating the display image includes a step of generating a display image in which a display mode of at least one of the setting values varying in value according to the comparison result and setting items corresponding to the setting values varying in value according to the comparison result is different from a display mode of others.

Effect

An image can be provided with which it is possible for a user to discern at a glance a difference in setting values used for image processing and image processing results depending on the difference in the setting values.

DESCRIPTION OF THE EMBODIMENTS

Hereinafter, an embodiment of the present invention is described with reference to the drawings. In the following description, the same components are designated by the same reference signs, and the names and functions thereof are the same. Therefore, detailed description thereof is omitted.

Application Example

[Configuration of Image Processing System 1]

Figure 1:
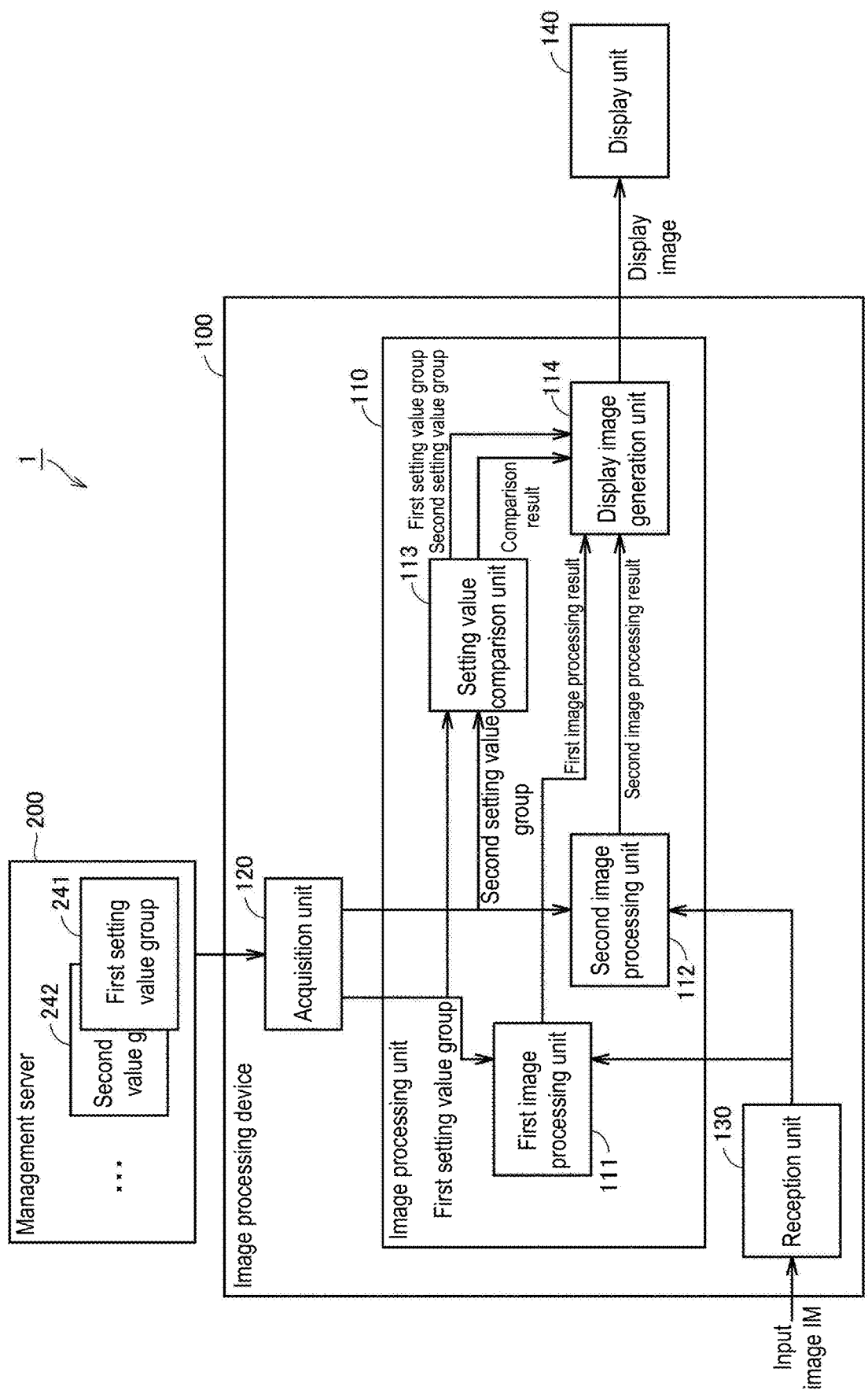
FIG. 1 is a diagram showing a configuration example of an image processing system.
Figure 2:
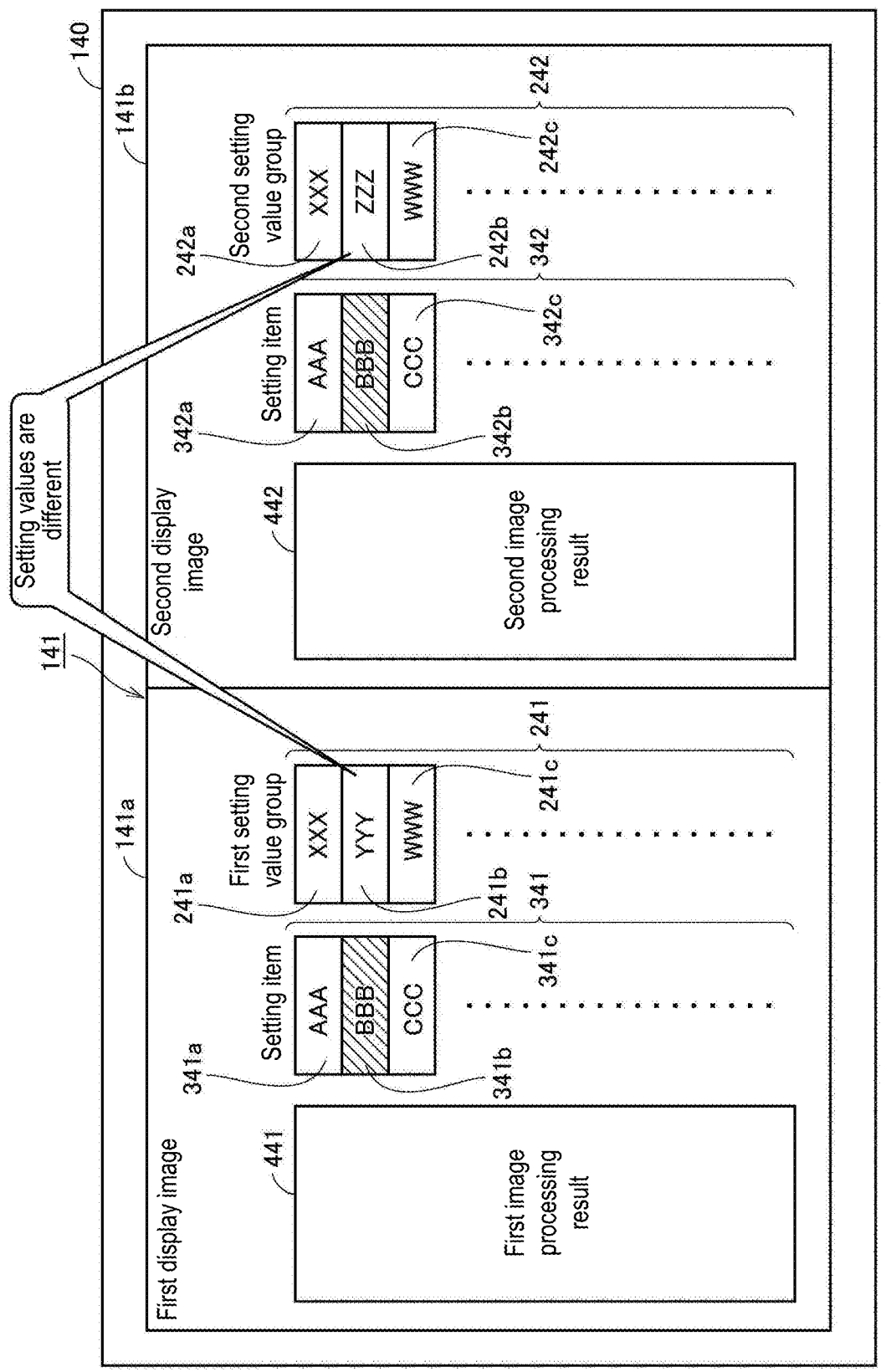
FIG. 2 is a diagram showing an example of a display image displayed on a display unit included in an image processing device.

FIG. 1 is a diagram showing a configuration example of an image processing system 1. FIG. 2 is a diagram showing an example of a display image 141 generated by a display image generation unit 114 included in an image processing device 100. With reference to FIG. 1, the image processing system 1 executes image processing such as character recognition or scratch inspection based on an input image IM generated by incorporating the image processing system 1 in a production line or the like and imaging a workpiece. The image processing system 1 includes the image processing device 100 and a management server 200. The image processing device 100 is electrically connected to and can communicate with the management server 200.

The image processing device 100 includes an image processing unit 110, an acquisition unit 120, and a reception unit 130. The image processing unit 110 performs image processing on the input image IM based on a setting value group. The setting value group refers to a plurality of parameter values used for image processing, and is constituted of a set of setting values corresponding to a plurality of setting items. The acquisition unit 120 acquires the setting value group from the management server 200 and transmits the setting value group to the image processing unit 110.

The management server 200 holds each setting value group in association with attribute information (for example, version information). The management server 200 holds a plurality of setting value groups such as a first setting value group 241 and a second setting value group 242.

The reception unit 130 of the image processing device 100 receives the input image IM photographed by a camera (camera 8 shown in FIG. 4 described later) and transmits the input image IM to the image processing unit 110.

The image processing unit 110 includes a first image processing unit 111, a second image processing unit 112, a setting value comparison unit 113, and the display image generation unit 114. The first setting value group 241 acquired by the acquisition unit 120 and the input image IM received by the reception unit 130 are transmitted to the first image processing unit 111.

The first image processing unit 111 receives the input image IM and the first setting value group 241, derives a first image processing result, and outputs the first image processing result to the display image generation unit 114. The first image processing unit 111 executes processing of recognizing characters in the input image IM (hereinafter, also referred to as "character recognition processing") by using, for example, dictionary data (dictionary data 250 shown in FIG. 5 described later). Therefore, the result of the character recognition processing is output as an example of the first image processing result output to the display image generation unit 114.

The second image processing unit 112 receives the input image IM and the second setting value group 242, derives a second image processing result, and outputs the second image processing result to the display image generation unit 114. The second image processing unit 112 executes character recognition processing by using, for example, the dictionary data 250. Therefore, the result of the character recognition processing is output as an example of the second image processing result output to the display image generation unit 114.

The display image generation unit 114 receives the first image processing result and the second image processing result, and generates the display image 141 (an image shown in FIG. 2 described later in which a first display image 141a is associated with a second display image 141b). The display image generation unit 114 outputs the generated display image 141 to a display unit 140. The display unit 140 displays the display image 141 to a user.

With reference to FIG. 2, the display image 141 is an image in which the first display image 141a is associated with the second display image 141b. The first display image 141a includes the first setting value group 241 corresponding to a plurality of setting items 341 and a first image processing result 441. The second display image 141b includes the second setting value group 242 corresponding to a plurality of setting items 342 and a second image processing result 442. The first display image 141a and the second display image 141b are associated with each other in a state of being arranged adjacent to each other on the left and right sides, and are displayed on the display unit 140.

The display image generation unit 114 generates an image in which the first display image 141a and the second display image 141b are associated with each other in a state of being arranged adjacent to each other on the left and right sides. More specifically, the display image generation unit 114 generates an image in which the first image processing result 441 included in the first display image 141a is arranged at a position farthest from the second display image 141b (left end) and the first setting value group 241 is arranged at a position adjacent to the second display image 141b (near the center). The display image generation unit 114 generates an image in which the plurality of setting items 341 are arranged at a position between the first image processing result 441 and the first setting value group 241. In addition, the display image generation unit 114 generates an image in which the second setting value group 242 included in the second display image 141b is arranged at a position farthest from the first display image 141a (right side) and the second image processing result 442 is arranged at a position adjacent to the first display image 141a (near the center). The display image generation unit 114 generates an image in which the plurality of setting items 342 are arranged at a position between the second image processing result 442 and the second setting value group 242. The image processing system 1 can provide an image that allows the user to compare the image processing result included in the first display image 141a with the image processing result included in the second display image 141b and confirm a difference between the setting values included in the first setting value group 241 and the setting values included in the second setting value group 242.

With reference to FIG. 1 again, the setting value comparison unit 113 included in the image processing device 100 compares the setting values corresponding to the same setting items in the setting values included in the first setting value group 241 and the setting values included in the second setting value group 242. The setting value comparison unit 113 outputs, to the display image generation unit 114, a first comparison result which is calculated by, for example, comparing a setting value 241a of a setting item 341a included in the first display image 141a with a setting value 242a of a setting item 342a included in the second display image 141b. The setting item 341a and the setting item 342a are the same setting item ("AAA"). In addition, the setting value comparison unit 113 outputs, to the display image generation unit 114, a second comparison result which is calculated by comparing a setting value 241b of a setting item 341b with a setting value 242b of a setting item 342b. Furthermore, the setting value comparison unit 113 outputs, to the display image generation unit 114, a third comparison result which is calculated by comparing a setting value 241c of a setting item 341c with a setting value 242c of a setting item 342c. The setting item 341b and the setting item 342b are the same setting item ("BBB"), and the setting item 341c and the setting item 342c are the same setting item ("CCC").

The first comparison result output by the setting value comparison unit 113 is a comparison result indicating that the setting values are the same value ("XXX"). In addition, the third comparison result output by the setting value comparison unit 113 is a comparison result indicating that the setting values are the same value ("WWW"). On the other hand, the second comparison result output by the setting value comparison unit 113 is a comparison result indicating that the setting values are different values (for example, "YYY" and "ZZZ").

The display image generation unit 114 receives the first image processing result from the first image processing unit 111 and receives the second image processing result from the second image processing unit 112. In addition, the display image generation unit 114 receives the first setting value group 241, the second setting value group 242 and the comparison result from the setting value comparison unit. The display image generation unit 114 generates the first display image 141a including the first setting value group 241 and the first image processing result, and the second display image 141b including the second setting value group 242 and the second image processing result. More specifically, the display image generation unit 114 generates the display image 141 in which the first display image 141a is associated with the second display image 141b. More specifically, the display image generation unit 114 generates the display image 141 in which the first display image 141a including the first image processing result 441, the plurality of setting items 341, and the first setting value group 241 is associated with the second display image 141b including the second image processing result 442, the plurality of setting items 342, and the second setting value group 242 (for example, the two images are arranged adjacent to each other on the left and right sides).

In addition, the display image generation unit 114 generates the display image 141 in which a display mode of the setting items corresponding to the setting values varying in value according to the comparison result is different from the display mode of other setting items. The display image generation unit 114 generates the display image 141 in which the display mode of the setting item 341b and the setting item 342b corresponding to the setting value 241b ("YYY") and the setting value 242b ("ZZZ") having different values is different (for example, highlighted) from the display mode of other setting items (for example, the setting item 341a and the setting item 342a).

The display image generation unit 114 generates, for example, the display image 141 in which the background color of the setting item 341b and the setting item 342b is different from the background color of the setting item 341a and the setting item 342a. More specifically, the display image generation unit 114 generates an image in which the background color of the setting item 341a and the setting item 342a is white, and generates the display image 141 in which the background color of the setting item 341b and the setting item 342b is red. The image processing system 1 can provide an image with which it is possible for the user to discern at a glance a difference in the setting values used for image processing and the image processing results depending on the difference in the setting values. The display unit 140 displays the display image 141 output from the display image generation unit 114.

In addition, the image processing device 100 receives changes in the setting values included in the first setting value group 241 and the setting values included in the second setting value group 242. The image processing device 100 receives changes of the setting values performed by the user, and generates a display image based on the newly set setting values. The image processing device 100 generates, for example, a display image including a processing result different from the first image processing result 441 included in the current first display image 141a (in this case, the same processing result as the second image processing result 442) by changing the setting value 241b ("YYY") in the first display image 141a to another value (for example, "ZZZ"). The image processing system 1 can provide an image that allows the user to compare the setting value before the change and the setting value after the change in the image processing.

Next, as for the display mode in the display image 141, a display mode different from the display mode shown in FIG. 2 is described. It is described in FIG. 2 that the display image generation unit 114 generates the display image 141 in which the display mode of the setting item 341b and the setting item 342b is different from the display mode of other setting items. In contrast, the display mode of the setting value may be set different from the display mode of other setting values.

Figure 3:
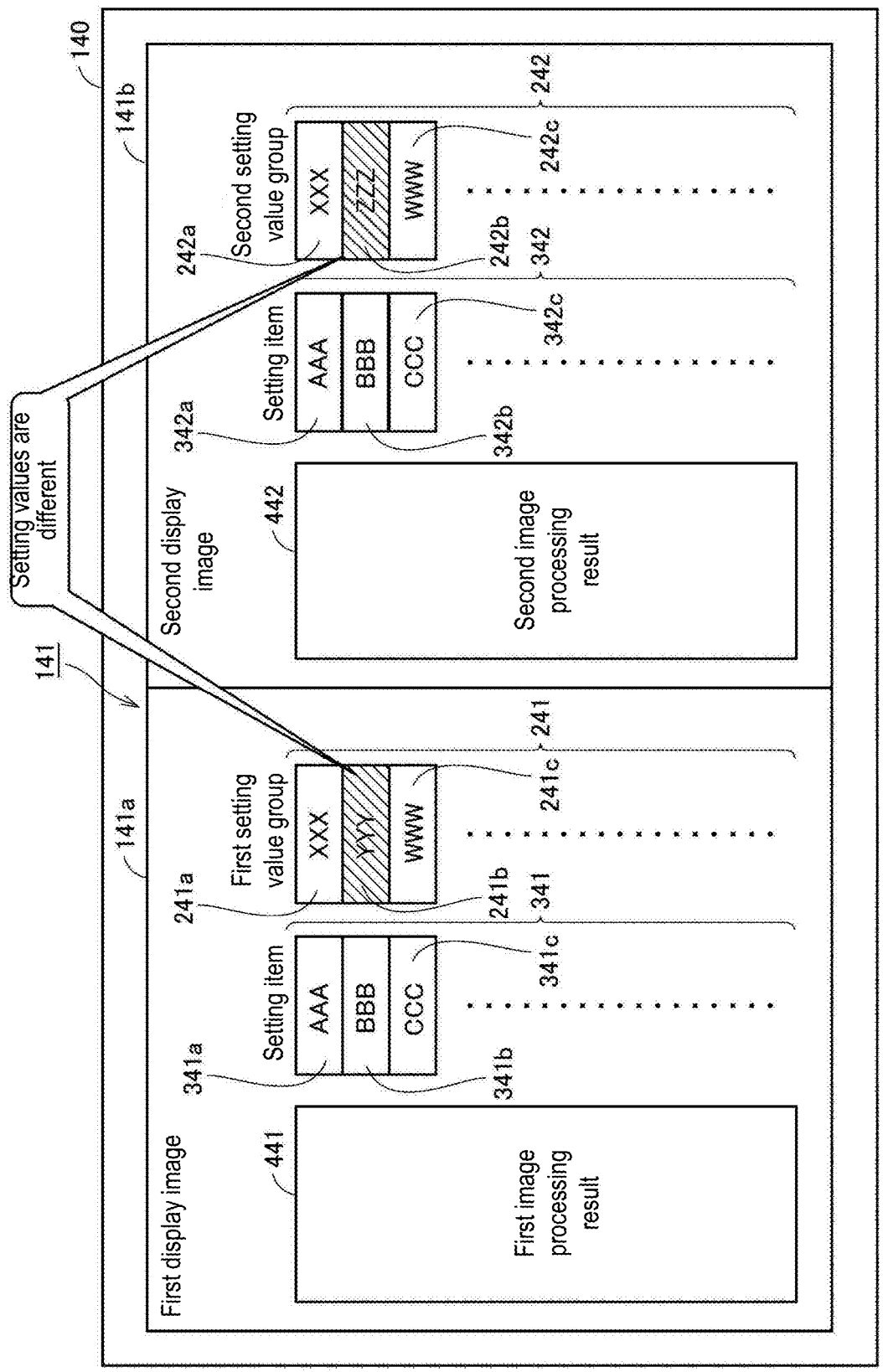
FIG. 3 is a diagram showing another example of a display image generated by a display image generation unit included in the image processing device.

FIG. 3 is a diagram showing another example of the display image 141 generated by the display image generation unit 114 included in the image processing device 100. The basic configuration of FIG. 3 is the same as the configuration of FIG. 2. FIG. 3 differs from the contents of FIG. 2 in that the target for changing the display mode is the setting value instead of the setting item described in FIG. 2.

The display image generation unit 114 generates the display image 141 in which the display mode of the setting value 241b ("YYY") and the setting value 242b ("ZZZ") having different values in the second comparison result of the first to the third comparison results is different from the display mode of other setting values (for example, the setting value 241a and the setting value 242a). The display image generation unit 114 generates, for example, an image in which the background color of the setting value 241b and the setting value 242b is different from the background color of the setting value 241a and the setting value 242a. In this way, the display image generation unit 114 generates the display image 141 in which the display mode of the setting values varying in value according to the comparison result is different (for example, highlighted) from the display mode of other setting values. The image processing system 1 can provide an image with which it is possible for a user to discern at a glance a difference in the setting values used for image processing and the image processing results depending on the difference in the setting values. The display unit 140 displays the display image 141 output from the display image generation unit 114.

[Specific Example of Image Processing System 1]

Figure 4:
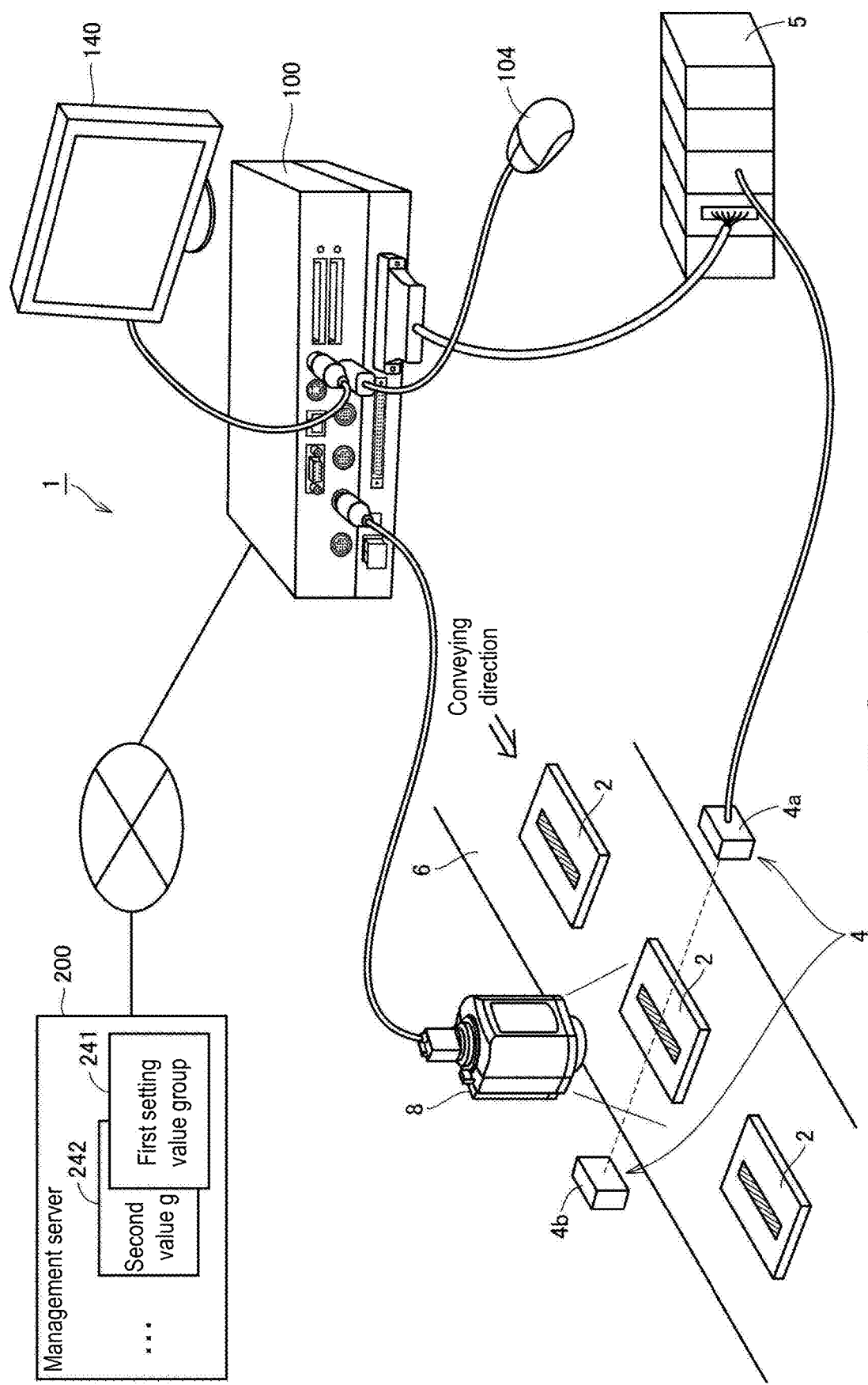
FIG. 4 is a diagram showing a specific example of the image processing system.

FIG. 4 is a diagram showing a specific example of the image processing system 1. With reference to FIG. 4, the image processing system 1 is incorporated in a production line or the like. The image processing system 1 executes, for example, character recognition processing on the input image IM obtained by imaging the workpiece 2 being an object. More specifically, the image processing system 1 specifies a region of the input image IM that matches a search condition and executes the character recognition processing according to a predetermined setting.

In the image processing system 1, the workpiece 2 is conveyed by a conveying mechanism 6 such as a belt conveyor, and the conveyed workpiece 2 is imaged by the camera 8 at a predetermined timing. As an example, the camera 8 includes an image sensor divided into a plurality of pixels, such as a coupled charged device (CCD) and a complementary metal oxide semiconductor (CMOS) sensor, in addition to an optical system such as a lens. Moreover, an illumination mechanism for irradiating light on the workpiece 2 imaged by the camera 8 may be further arranged. The input image IM obtained by imaging with the camera 8 is transmitted to the image processing device 100. The image processing device 100 executes the character recognition processing or the like on the input image IM received from the camera 8 via the reception unit 130, and outputs the display image 141 to the display unit 140.

The display unit 140 is, for example, a liquid crystal display, an organic electro luminescence (EL) display, or other display devices.

Moreover, the arrival of the workpiece 2 in the field of view of the camera 8 is detected by a photoelectric sensor 4 arranged at both ends of the conveying mechanism 6. Specifically, the photoelectric sensor 4 includes a light receiving unit 4a and a light projecting unit 4b arranged on the same optical axis. The arrival of the workpiece 2 is detected when the light receiving unit 4a detects that the light emitted from the light projecting unit 4b is shielded by the workpiece 2. A trigger signal of the photoelectric sensor 4 is output to a programmable logic controller (PLC) 5. The PLC 5 receives the trigger signal from the photoelectric sensor 4 or the like, and controls the conveying mechanism 6.

The image processing device 100 executes measurement processing (image processing) on the workpiece 2 and sets search conditions (for example, a format character string described later), setting values being measurement parameters, and the like.

The image processing device 100 receives an operation command given by the user by operating a mouse 104 or a keyboard (not shown) being an input device. In addition, the image processing device 100 is a computer having a general-purpose architecture, and provides various functions by executing pre-installed programs (instruction codes).

When a general-purpose computer is used as the image processing device 100, an operating system (OS) for providing the basic functions of the computer may be installed in addition to the application for providing the functions according to the present embodiment. In this case, the program according to the present embodiment may call the necessary modules of the program modules provided as a part of the OS in a predetermined array at a predetermined timing to execute the processing. That is, the program according to the present embodiment does not include the module as described above, and the processing may be executed by the cooperation of the program with the OS. The program according to the present embodiment may not include a part of the modules. Furthermore, the program according to the present embodiment may be incorporated into a part of another program. In that case, the program does not include the modules included in the another program combined as described above, and is executed in cooperation with the another program.

[Hardware Configuration Example of Image Processing Device 100]

Figure 5:
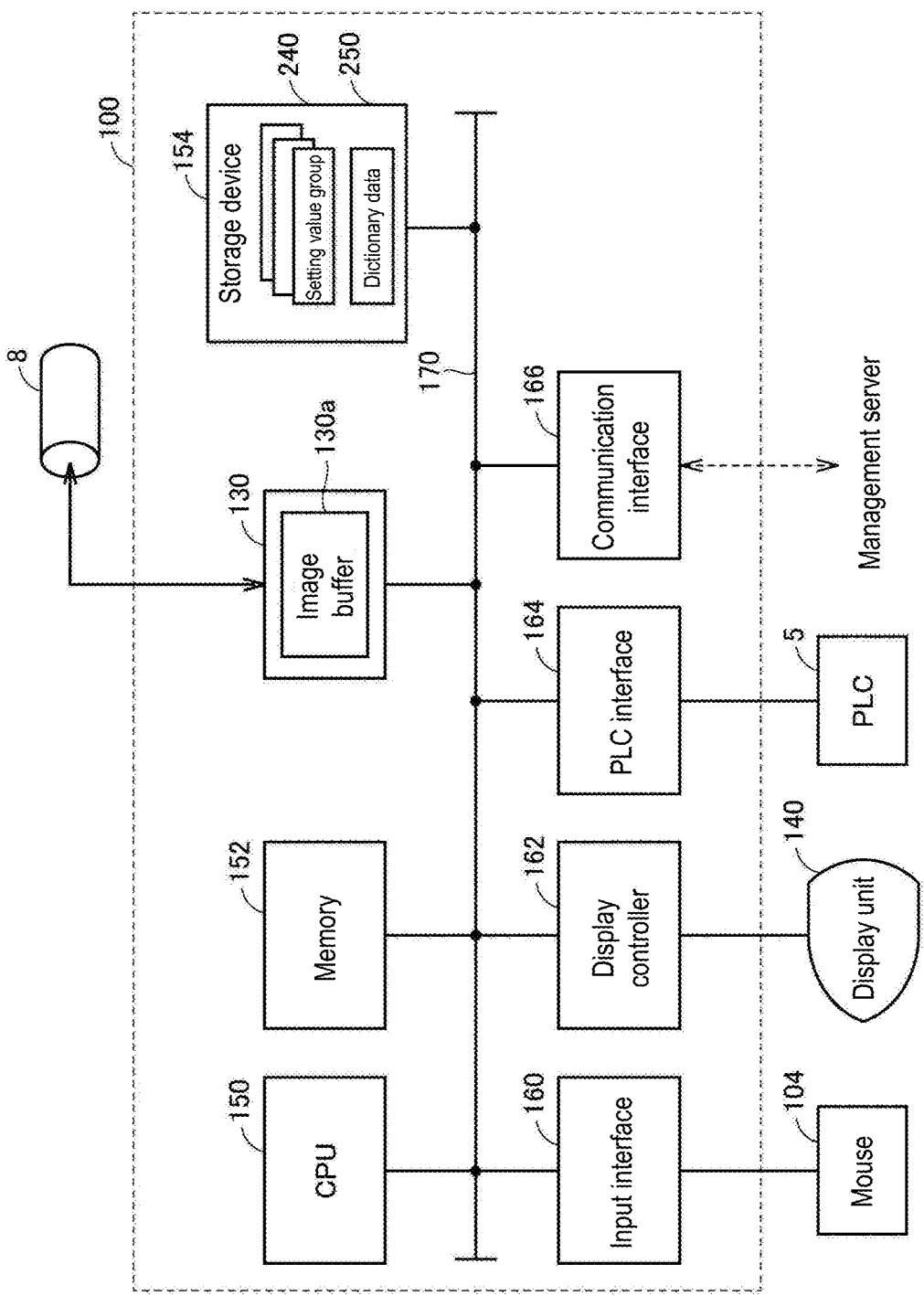
FIG. 5 is a diagram illustrating a hardware configuration example of the image processing device.

FIG. 5 is a diagram illustrating a hardware configuration example of the image processing device 100. With reference to FIG. 5, the image processing device 100 includes a central processing unit (CPU) 150 being an arithmetic processing unit, a memory 152 and a storage device 154 serving as a storage unit, the reception unit 130, an input interface 160, a display controller 162, a PLC interface 164, and a communication interface 166. These parts are connected to each other via a bus 170 so as to enable data communication therebetween.

The CPU 150 functions as an image processing unit by expanding the programs (codes) stored in the storage device 154 in the memory 152 and executing the programs in a predetermined order. More specifically, the CPU 150 expands the programs in the memory 152 and executes various functions in the image processing unit 110. The memory 152 is, for example, a volatile device such as a dynamic random access memory (DRAM). In addition to the programs read from the storage device 154, the memory 152 holds the input image IM acquired by the camera 8, a plurality of setting values used for the image processing on the input image IM, and the like.

The storage device 154 is, for example, a non-volatile device such as a hard disk, a solid state drive (SSD), or the like, and holds a plurality of setting value groups 240 acquired from the management server 200. In addition, the storage device 154 holds the dictionary data 250. The dictionary data 250 is used when the CPU 150 functions as the image processing unit 110. The first image processing unit 111 and the second image processing unit 112 execute the character recognition processing in the input image IM.

The reception unit 130 is an interface for mediating data transmission between the CPU 150 and the camera 8. The reception unit 130 is connected to the camera 8 for imaging the workpiece 2 to generate image data. More specifically, the reception unit 130 can be connected to one or more cameras 8, and includes an image buffer 130a for temporarily storing image data from the cameras 8. Then, when the image data of a predetermined number of frames is stored in the image buffer 130a, the reception unit 130 transfers the input image IM being the stored image data to the memory 152. In this way, the input image IM photographed in real time by the camera 8 is transferred to the memory 152.

The input interface 160 mediates data transmission between the CPU 150 and an input unit such as the mouse 104 and a keyboard. That is, the input interface 160 receives an operation command given by the user by operating the input unit. The display controller 162 is connected to the display unit 140, and displays the display image 141 on the display unit 140.

The PLC interface 164 mediates data transmission between the CPU 150 and the PLC 5. More specifically, the PLC interface 164 transmits, to the CPU 150, information relating to the state of the production line controlled by the PLC 5 and information relating to the workpiece. The communication interface 166 mediates data transmission between the CPU 150 and the management server 200. The communication interface 166 may use, for example, any of the general network protocol EtherNET (registered trademark), EtherCAT (registered trademark) and EtherNet/IP (registered trademark) used as industrial network protocols, or the like.

[Hardware Configuration Example of Management Server 200]

Figure 6:
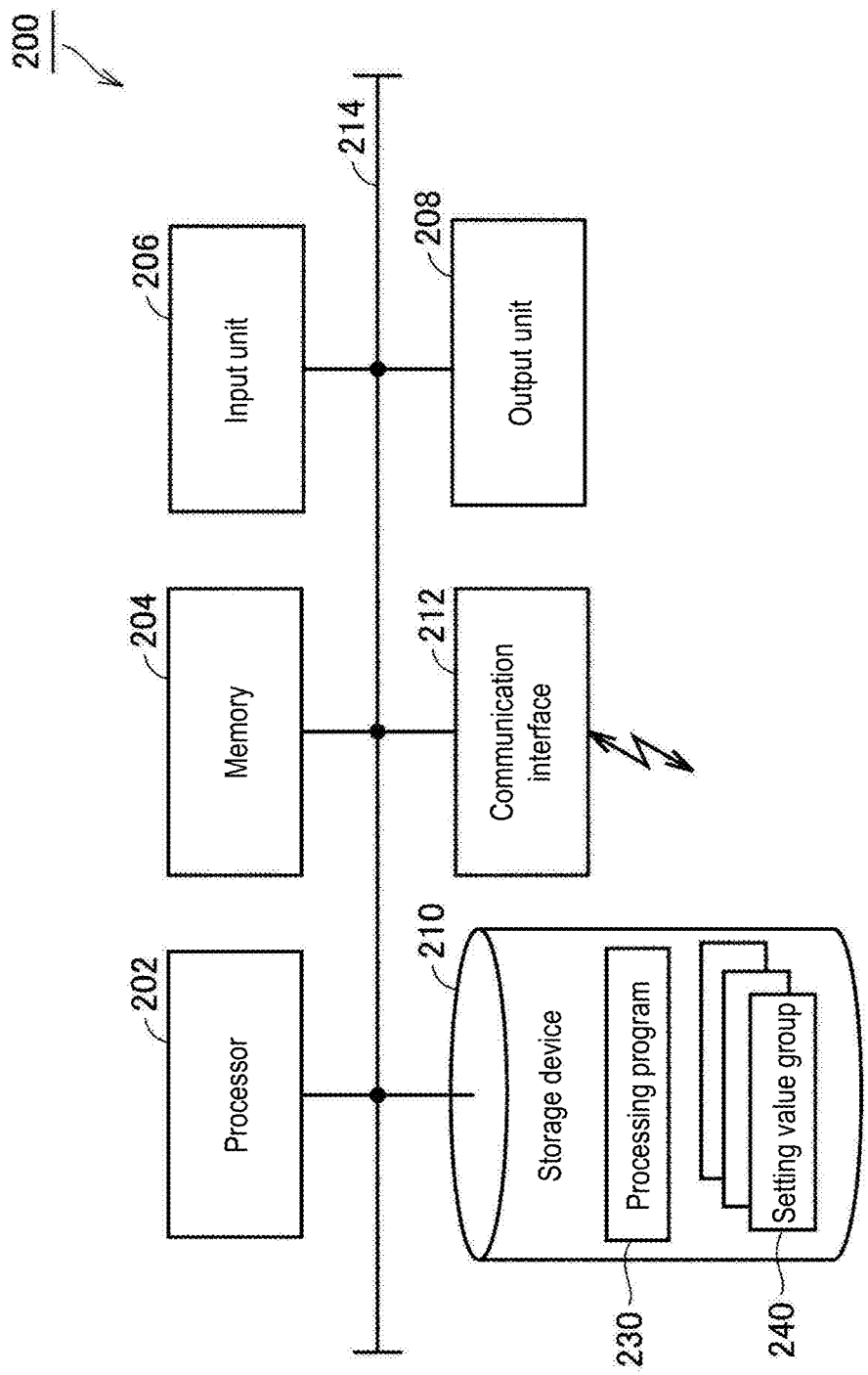
FIG. 6 is a diagram illustrating a hardware configuration example of a management server.

FIG. 6 is a diagram illustrating a hardware configuration example of the management server 200. With reference to FIG. 6, the management server 200 includes a processor 202 executing various programs, a memory 204 providing a work region for storing the data necessary for executing the programs in the processor 202, a storage device 210 saving programs executed by the processor 202 or the like. The memory 204 is, for example, a volatile device such as a dynamic random access memory (DRAM) or the like. In addition, the storage device 210 is, for example, a non-volatile device such as a hard disk, a solid state drive (SSD), or the like.

The management server 200 includes an input unit 206 for receiving an operation from the user and an output unit 208 for displaying the processing result and the like to the user. The input unit 206 is constituted of, for example, at least one of a mouse, a keyboard, and the like, and the output unit 208 is constituted of, for example, at least one of a display, various indicators, a printer, and the like.

The management server 200 further includes a communication interface 212 for exchanging data relating to image processing with the image processing device 100. As for these interfaces, hardware corresponding to the target network is adopted. The above components are connected to each other via an internal bus 214.

Moreover, the function of the management server 200 may be replaced by the PLC, or may be implemented as a dedicated device using an application specific integrated circuit (ASIC) or the like.

The storage device 210 saves a processing program 230 and the setting value group 240. The processing program is a program which the processor 202 expands in the memory 204 to execute various operations.

The management server 200 transmits the setting value group 240 to the image processing device 100 via the communication interface 212. In addition, the management server 200 has a function of managing the change history for each version being the attribute information of the setting value group 240 when the value of one setting value group 240 sent to the image processing device 100 is edited. Therefore, the management server 200 functions as a version management server that saves the setting value group 240 for each version.

The "version" is a notation indicating that a setting value group 240 has been created and a change has been made to the setting value group 240. Besides, "saving the setting value group 240 for each version" means, for example, saving the change history of the setting value group 240. Moreover, the storage device 210 for saving the change history is not required to be included in the management server 200, and may be included in a device to which the management server 200 can be appropriately connected.

Figure 7:
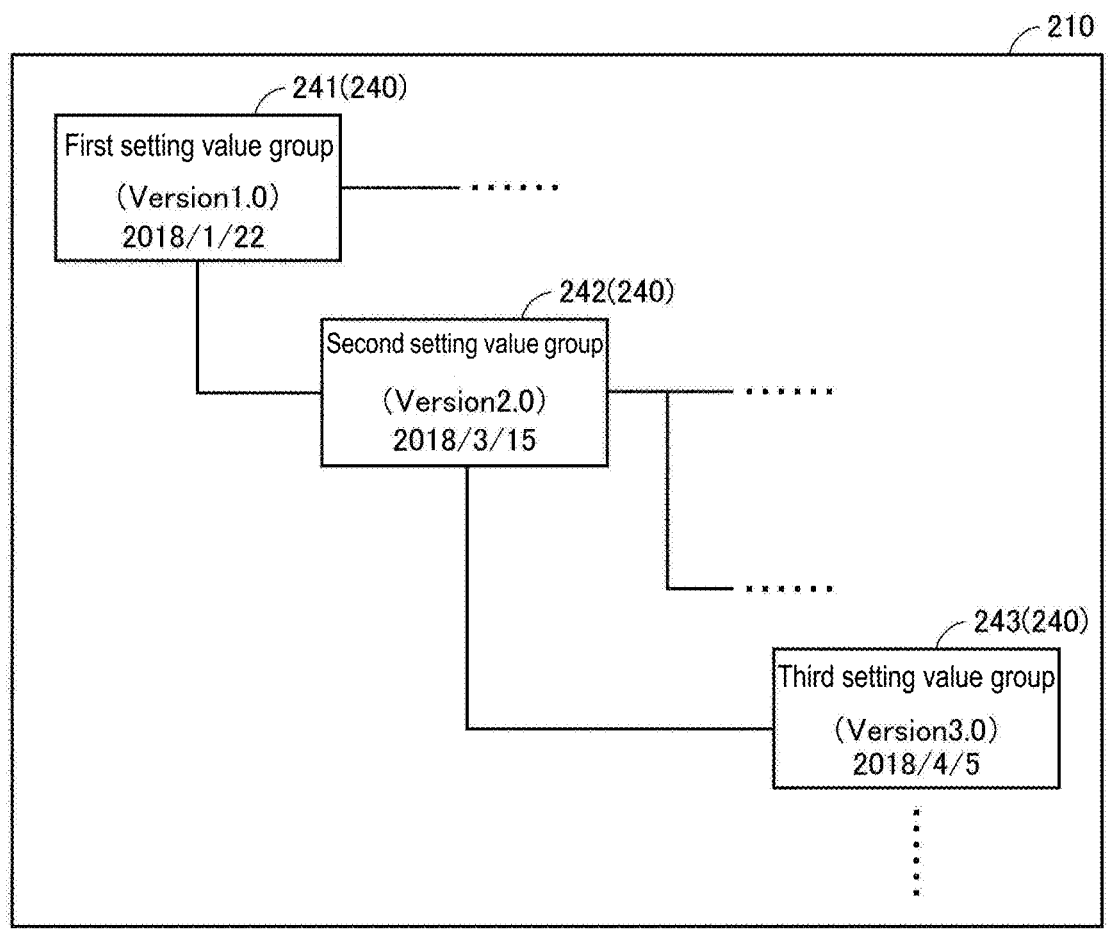
FIG. 7 is a diagram showing an example of a change history of a setting value group.

FIG. 7 is a diagram illustrating a change history of the setting value group 240. With reference to FIG. 7, each setting value group 240 is saved in association with the version information being the attribute information. In addition, the setting value group 240 includes information such as the date and the time when the setting value group 240 was generated. More specifically, the first setting value group 241 associated with the attribute information of version 1.0 is the initial setting value group generated on Jan. 22, 2018. After the first setting value group 241 was generated, the second setting value group 242 associated with the attribute information of version 2.0 was generated on Mar. 15, 2018, and the third setting value group 243 associated with the attribute information of version 3.0 was generated on Apr. 5, 2018 and saved in the storage device 210. Thus, when the setting value of the setting value group 240 is changed, the history information is saved in the storage device 210 of the management server 200.

[Specific Example of Display Image 141]

Figure 8:
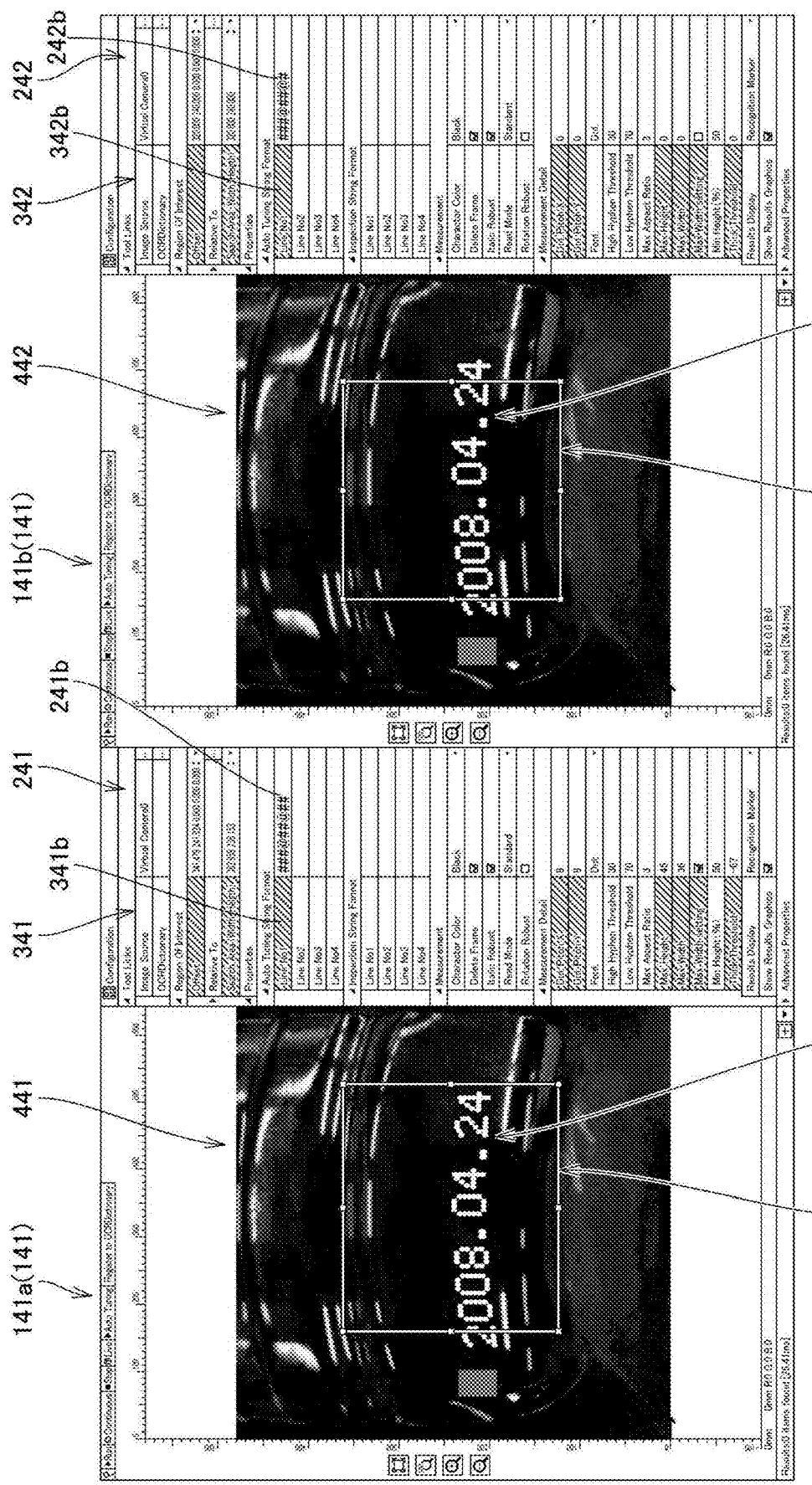
FIG. 8 is a diagram showing a specific example of a display image.

FIG. 8 is a diagram showing a specific example of the display image 141. The image processing device 100 generates the display image 141. The generated display image 141 is displayed on the display unit 140. The display image 141 includes the first display image 141a and the second display image 141b. The first display image 141a includes the first image processing result 441, the setting item 341, and the first setting value group 241. In addition, the second display image 141b includes the second image processing result 442, the setting item 342, and the second setting value group 242.

The setting value comparison unit 113 of the image processing device 100 calculates the comparison result obtained by comparing the setting values corresponding to the same setting item in the setting values included in the first setting value group 241 and the setting values included in the second setting value group 242. The display image generation unit 114 generates the display image 141 in which the display mode of the setting items corresponding to the setting values varying in value according to the comparison result is different from the display mode of other setting items. For example, the setting value 241b "###@##@##" in the first display image 141a is different from the setting value 242b "###@##@#" in the second display image 141b shown in FIG. 8 (the number of # is different), and thus the display mode of the setting item 341b "Line No1" and the setting item 342b "Line No1" corresponding to these setting values is different (for example, highlighted) from the display mode of other setting items.

The symbols "#" and "@" in the setting value 241b and the setting value 242b are format character strings. The format character string typically specifies a character type or character for each character to be recognized. In other words, the format character string specifies a character type or a character combination for the character string to be recognized. The characters include hiragana, kanji, letters, numbers, symbols, and the like. In the character recognition processing, for example, "#" makes only numbers (for example, "0 to 9") as recognition candidates, and "@" makes only symbols (for example, ".", ":", "-") as recognition candidates.

The setting value 241b is different from the setting value 242b, and therefore the first image processing result 441 is different from the second image processing result 442. More specifically, in the second image processing result 442, a character recognition region 521 is set based on the setting value 242b, and "008.04.2" in an image 452 representing characters is recognized. In contrast, in the first image processing result 441, a character recognition region 511 is set based on the setting value 241b, and "008.04.24" in an image 451 representing characters is recognized. In this way, the display image generation unit 114 generates the display image 141 in which the setting value groups having different setting values and the image processing results are displayed side by side. Accordingly, the image processing system 1 can provide the display image 141 with which it is possible for the user to discern at a glance a difference in the setting values used for image processing, and the image processing results depending on the difference in the setting values.

[Control Structure of Image Processing System]

Figure 9:
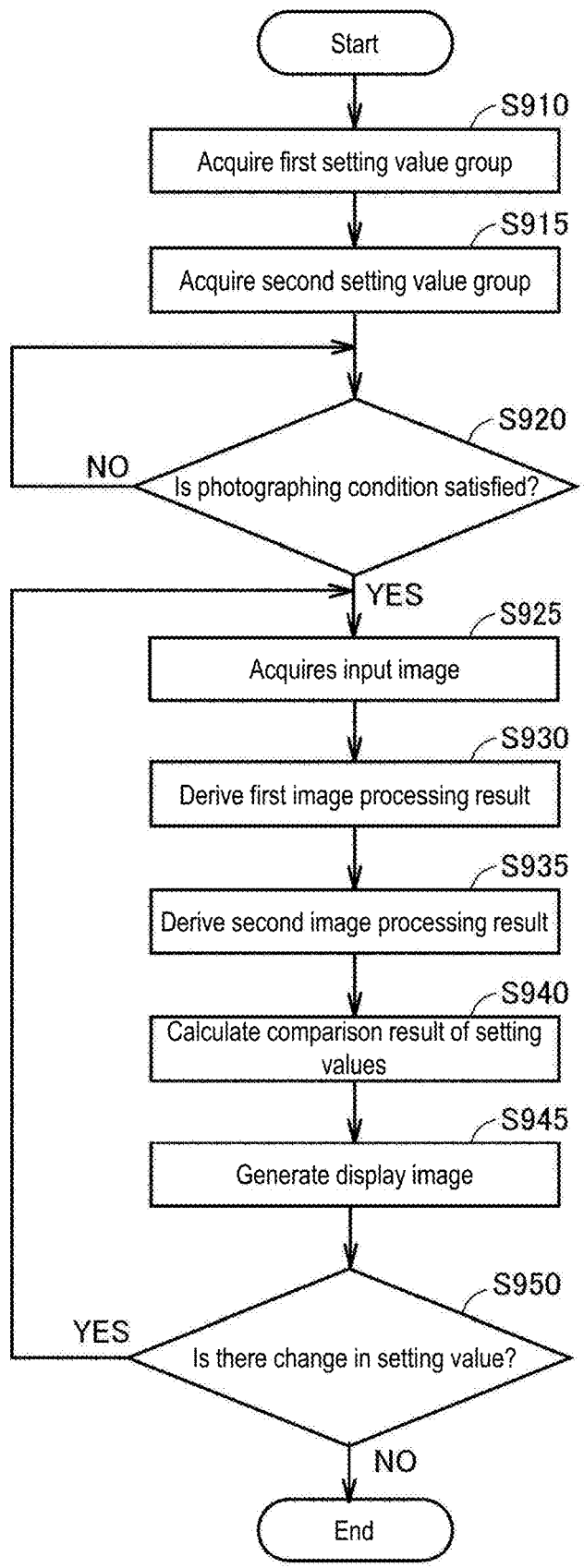
FIG. 9 is a flowchart showing a control procedure in the image processing system.

FIG. 9 is a flowchart showing a control procedure in the image processing system 1. The processing of this flowchart is executed when, for example, the image processing device 100 receives an operation command from the input unit including the mouse 104 and the keyboard.

In step S910, the acquisition unit 120 of the image processing device 100 acquires the first setting value group 241 from the management server 200 via the communication interface 166, and outputs the first setting value group 241 to the first image processing unit 111 and the setting value comparison unit 113.

In step S915, the acquisition unit 120 of the image processing device 100 acquires the second setting value group 242 from the management server 200 via the communication interface 166, and outputs the second setting value group 242 to the second image processing unit 112 and the setting value comparison unit 113. Thus, the image processing device 100 acquires a plurality of setting value groups 240 having different versions from the management server 200.

In step S920, the image processing device 100 determines whether or not the photographing condition of the camera 8 is satisfied. When the workpiece 2 reaches the field of view of the camera 8 according to the detection result of the photoelectric sensor 4, the image processing device 100 determines that the photographing condition is satisfied (YES in step S920), and switches the control to step S930.

Otherwise (NO in step S920), the image processing device 100 returns to the processing of step S920 and repeatedly executes this processing.

In step S925, the acquisition unit 120 acquires the input image IM photographed in real time by the camera 8. Thus, the acquisition unit 120 acquires the input image IM obtained by photographing the workpiece 2 during conveyance by the camera 8. The acquired input image IM is transmitted to the first image processing unit 111 and the second image processing unit 112.

In step S930, the first image processing unit 111 of the image processing device 100 derives the first image processing result 441 indicating the result of performing image processing on the input image IM according to the first setting value group 241. The first image processing unit 111 outputs the first image processing result 441 to the display image generation unit 114.

In step S935, the second image processing unit 112 of the image processing device 100 derives the second image processing result 442 indicating the result of performing image processing on the input image IM according to the second setting value group 242. The second image processing unit 112 outputs the second image processing result 442 to the display image generation unit 114.

In step S940, the setting value comparison unit 113 of the image processing device 100 calculates the comparison result obtained by comparing the setting values corresponding to the same setting item in the setting values included in the first setting value group 241 and the setting values included in the second setting value group 242. The setting value comparison unit 113 outputs the calculated comparison result to the display image generation unit 114. In addition, the setting value comparison unit 113 outputs the first setting value group 241 and the second setting value group 242 received from the acquisition unit 120 to the display image generation unit 114.

In step S945, the display image generation unit 114 of the image processing device 100 generates the display image 141 in which the first display image 141a including the first setting value group 241 and the first image processing result 441 is associated with the second display image 141b including the second setting value group 242 and the second image processing result 442. Furthermore, the display image generation unit 114 generates a display image in which the display mode of at least one of the setting values varying in value according to the comparison result and the setting items corresponding to the setting values varying in value according to the comparison result is different from the display mode of other setting values or setting items. Then, the display image generation unit 114 outputs the generated display image 141 to the display unit 140. The image processing system 1 can provide the display image 141 that allows the user to compare the setting value before the change and the setting value after the change in the image processing.

In step S950, the image processing device 100 determines whether the change of the setting value performed by the input unit including the mouse 104 and the keyboard is received or not. When the image processing device 100 receives the change of the setting value performed by the input unit (YES in step S950), it switches the control to step S925. The image processing device 100 executes image processing on the input image IM, which is the same as the previous processing, based on a setting value different from the previous processing. When the user adjusts the setting value by trial and error, the image processing device 100 repeatedly executes the processing from step S925 to step S950. Otherwise (NO in step S950), the image processing device 100 ends the processing of the flowchart.

Moreover, when the image processing device 100 receives the change of the setting value performed by the input unit, the image processing device 100 may transmit the setting value group 240 including the changed setting value to the management server 200 via the communication interface 166. The management server 200 saves the setting value group received via the communication interface 212 as the setting value group 240 of a new version together with the setting value groups 240 of other versions. When the image processing device 100 receives, for example, a change to the setting value included in the second setting value group 242 described with reference to FIG. 7, the image processing device 100 transmits the changed setting value group 240 to the management server 200. The management server 200 saves the received changed setting value group 240 as the third setting value group 243 in the storage device 210. The image processing system 1 can reliably save the information of the setting value group 240 of the latest version together with the setting value group 240 of the old version.

Second Embodiment

Hereinafter, a second embodiment according to the present invention is described. The image processing system according to the second embodiment is realized by using the same hardware configuration as the image processing system 1 according to the embodiment described above. Therefore, the description of the hardware configuration is omitted.

In the first embodiment, the display image 141 (for example, the display image 141 shown in FIG. 3) is an image in which the first display image 141a and the second display image 141b are arranged side by side. The second image processing result 442 is arranged at a position adjacent to the first setting value group 241, and the second setting value group 242 is arranged at a position farthest from the first setting value group 241. In contrast, in the second embodiment, the image processing device 100 replaces the arrangement of the second image processing result 442 and the second setting value group 242. Besides, the image processing device 100 generates the display image 141 in which the plurality of setting items 341 are arranged between the first setting value group 241 and the second setting value group 242 and displays the display image 141 on the display unit 140.

Figure 10:
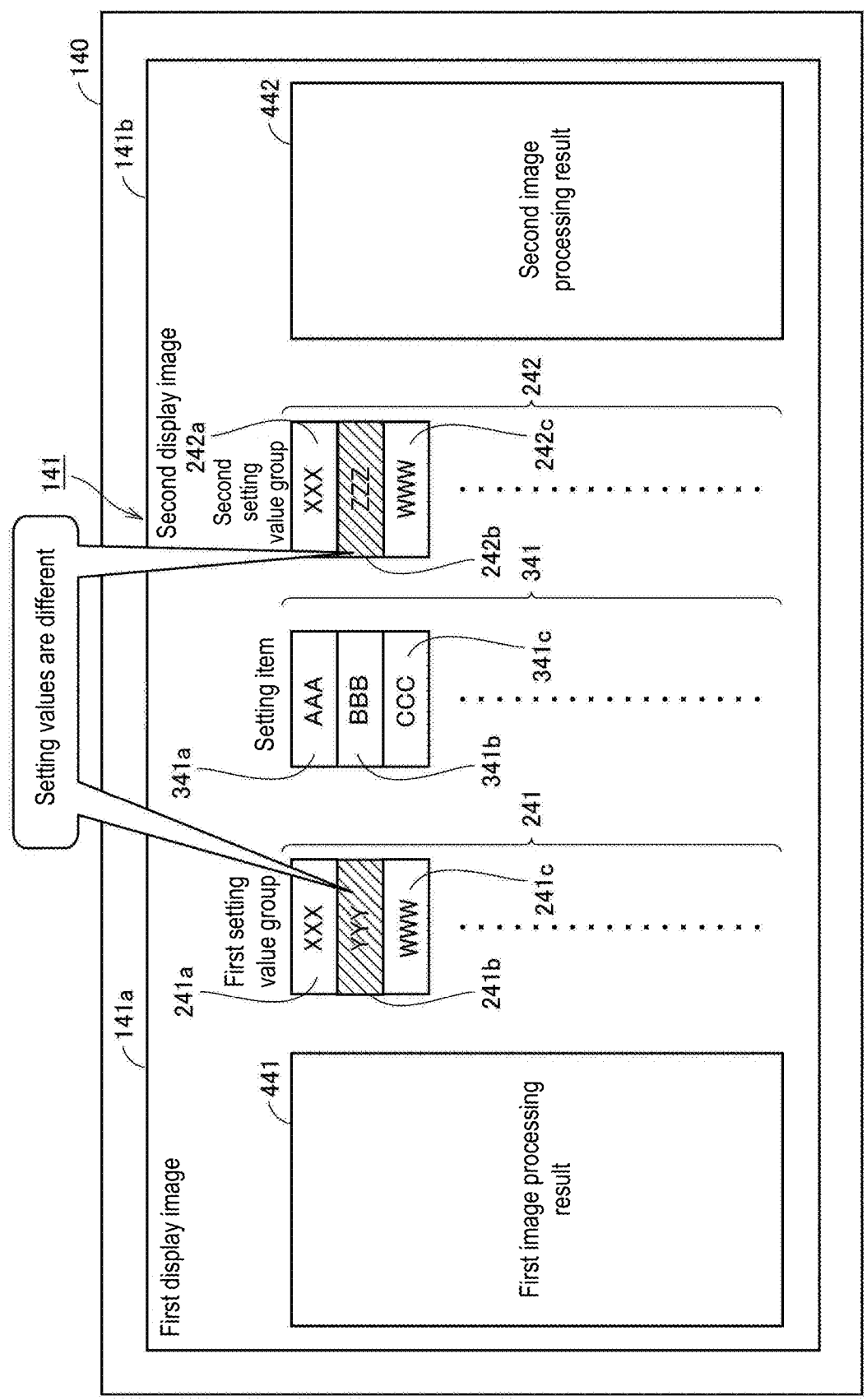
FIG. 10 is a diagram showing another specific example of the display image.

FIG. 10 is a diagram showing another specific example of the display image 141. With reference to FIG. 10, the display image generation unit 114 generates the display image 141 in which the plurality of setting items 341 are arranged substantially in the center of the image. More specifically, the display image generation unit 114 generates the display image 141 in which the plurality of setting items 341 are arranged in the center of the display image 141, and the first setting value group 241 (left side) and the second setting value group 242 (right side) are arranged adjacent to the left and right sides of the setting items 341. In addition, the display image generation unit 114 generates the display image 141 in which the plurality of setting items 341 described above are arranged adjacent to one side (right side) of the first setting value group 241 of the display image 141, and the first image processing result 441 is arranged adjacent to the other side (left side). Furthermore, the display image generation unit 114 generates the display image 141 in which the plurality of setting items 341 described above are arranged adjacent to one side (left side) of the second setting value group 242 of the display image 141, and the second image processing result 442 is arranged adjacent to the other side (right side). Thus, the display image generation unit 114 generates the display image 141 in which the plurality of setting items 341 are arranged at substantially the center of the display image 141, the first setting value group 241 is arranged at a position adjacent to one of the left and right sides with respect to the plurality of setting items 341, and the second setting value group 242 is arranged at a position adjacent to the other side.

The display image generation unit 114 generates the display image 141 in which the plurality of setting items 341 and the plurality of setting items 342 in the display image 141 are regarded as the plurality of setting items 341 only, and the first setting value group 241 and the second setting value group 242 are arranged on two sides of the plurality of setting items 341. The image processing system 1 can provide an image that allows the user to easily compare each setting value in the first setting value group 241 and the second setting value group 242 by associating the setting value with the corresponding setting item. In addition, the image processing system 1 can provide an image in which the display regions of the first image processing result 441 and the second image processing result 442 in the display image 141 having a predetermined size can be expanded by regarding the plurality of setting items 341 and the plurality of setting items 342 as the plurality of setting items 341 only, and with which it is possible for the user to confirm the processing result in detail as compared with before expanding the display region. Moreover, the plurality of setting items 341 and the plurality of setting items 342 in the display image 141 may be regarded as the plurality of setting items 342 only.

Third Embodiment

Hereinafter, a third embodiment according to the present invention is described. The image processing system according to the third embodiment is realized by using the same hardware configuration as the image processing system 1 according to the embodiment described above. Therefore, the description of the hardware configuration is omitted.

In the first embodiment, it is described that the image processing device 100 generates the display image 141 in which the first display image 141a and the second display image 141b are arranged adjacent to each other on the left and right sides. In contrast, in the third embodiment, the image processing device 100 generates the display image 141 in which the first display image 141a is superimposed on the second display image 141b.

Figure 11:
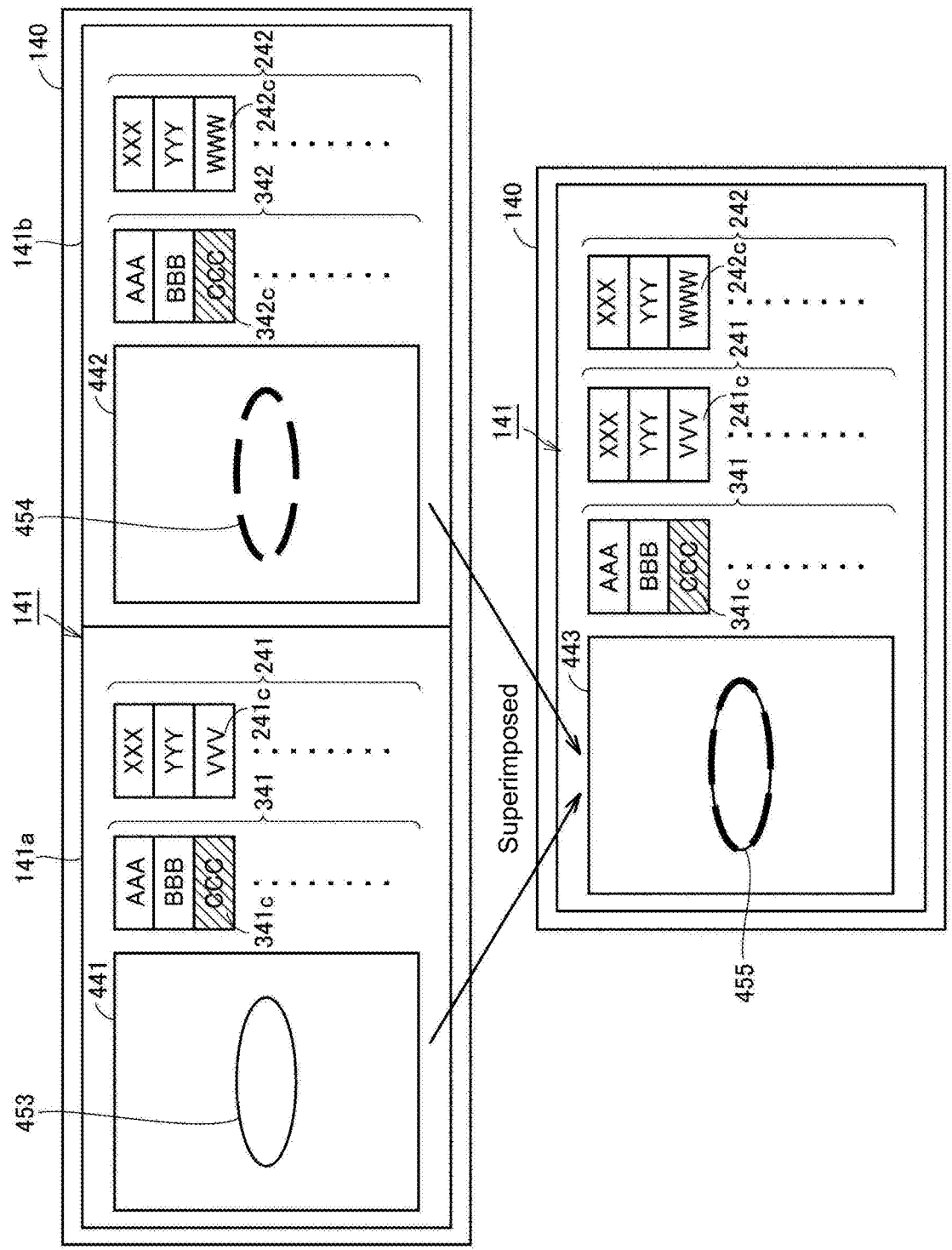
FIG. 11 is a diagram illustrating a display image in which a first image processing result is superimposed on a second image processing result.

FIG. 11 is a diagram illustrating the generation of the display image 141 in which the first image processing result 441 is superimposed on the second image processing result 442. With reference to FIG. 11, the display image generation unit 114 of the image processing device 100 generates an image processing result 443 in which the first image processing result 441 including a first edge image 453 is superimposed on the second image processing result 442 including a second edge image 454. The image processing result 443 includes an edge image 455 in which the first edge image 453 is superimposed on the second edge image 454. The image processing result of the edge image is different when, for example, the setting item 341c and the corresponding setting value 241c are different from the setting item 342c and the corresponding setting value 242c.

The setting item (CCC) is, for example, a threshold related to luminance, and an edge is extracted when a luminance difference between pixels is equal to or greater than the threshold. Besides, the setting values indicate threshold values. By making the setting value 241 smaller than the setting value 242c (for example, VVV<WWW), the edges of the first edge image 453 representing the shape of an object are extracted more clearly than the second edge image 454. The image processing device 100 displays, on the display unit 140, the display image 141 which includes the image processing result 443 including the edge image 455 in which the first edge image 453 is superimposed on the second edge image 454. The image processing system 1 can provide an image that more clearly shows a difference in the setting values in the image processing for recognizing the shape of the object included in the display image 141 and a difference in the image processing results depending on the difference in the setting values.

Fourth Embodiment

Hereinafter, a fourth embodiment according to the present invention is described. The image processing system according to the fourth embodiment is realized by using the same hardware configuration as the image processing system 1 according to the embodiment described above. Therefore, the description of the hardware configuration is omitted.

Figure 12:
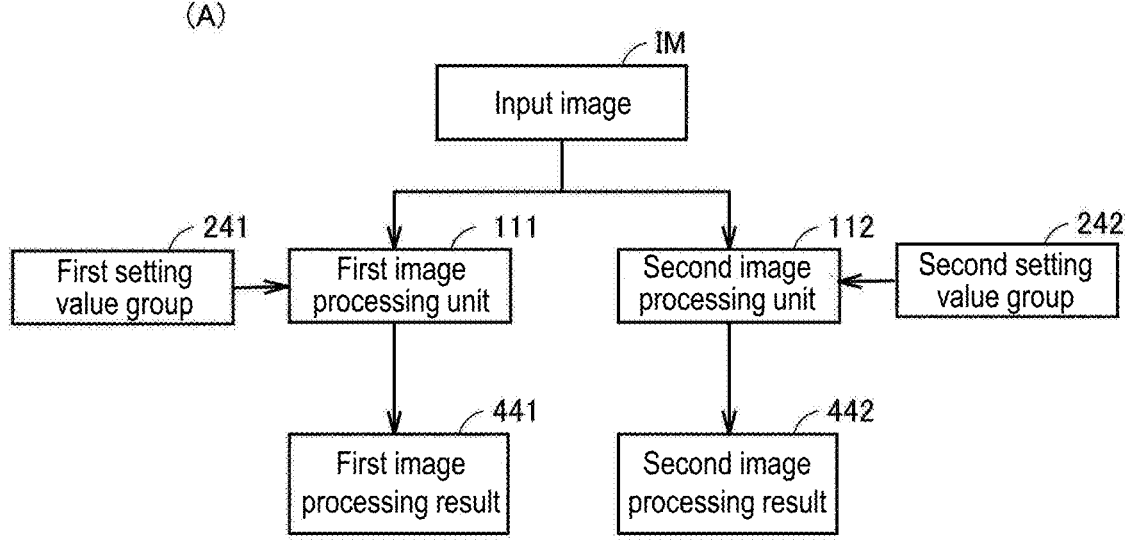
FIG. 12 is a diagram illustrating a case in which input images output to the first image processing unit and the second image processing unit are the same and a case in which the input images output to the first image processing unit and the second image processing unit are different.
Figure 12:
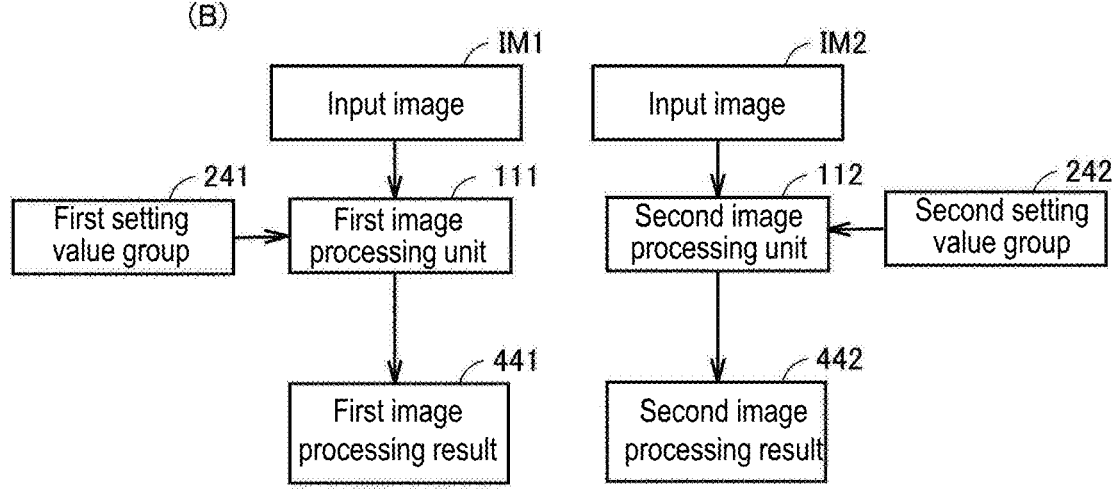

FIG. 12 is a diagram illustrating a case in which the input images IM output to the first image processing unit 111 and the second image processing unit 112 are the same and a case in which the input images IM output to the first image processing unit 111 and the second image processing unit 112 are different. (A) of FIG. 12 is a diagram showing an outline of image processing when the input images IM are the same image. More specifically, the first image processing result 441 is output by outputting the input image IM received by the reception unit 130 to the first image processing unit 111 and performing image processing according to the first setting value group 241. In addition, the second image processing result 442 is output by outputting to the second image processing unit 112 the input image IM being the same as the input image IM output to the first image processing unit 111 and performing image processing according to the second setting value group 242. The image processing system 1 can generate an image that clearly shows a difference in image processing results depending on different setting value groups for the same input image IM.

(B) of FIG. 12 is a diagram showing an outline of image processing when the input images IM are two different images. More specifically, the first image processing result 441 is output by outputting the input image IM1 received by the reception unit 130 to the first image processing unit 111 and performing image processing according to the first setting value group 241. In addition, the second image processing result 442 is output by outputting to the second image processing unit 112 the input image IM2 being different from the input image IM1 output to the first image processing unit 111 and performing image processing according to the second setting value group 242. The image processing system 1 can generate an image that clearly shows a difference in image processing results depending on different setting value groups for the different input images IM1 and IM2.

Moreover, the input image IM may be an image photographed in real time by the camera 8 described in the embodiment, or an image saved in the storage device 154 of the image processing device 100. The image saved in the storage device 154 includes, for example, an image photographed by the camera 8 in the past. The image processing system 1 can execute image processing at an arbitrary timing and can improve user convenience.

Fifth Embodiment

Hereinafter, a fifth embodiment according to the present invention is described. The image processing system according to the fifth embodiment is realized by using a hardware configuration which is the same as the image processing system 1 according to the embodiment described above except that a part is different. Therefore, the description of the same hardware configuration is omitted.

Figure 13:
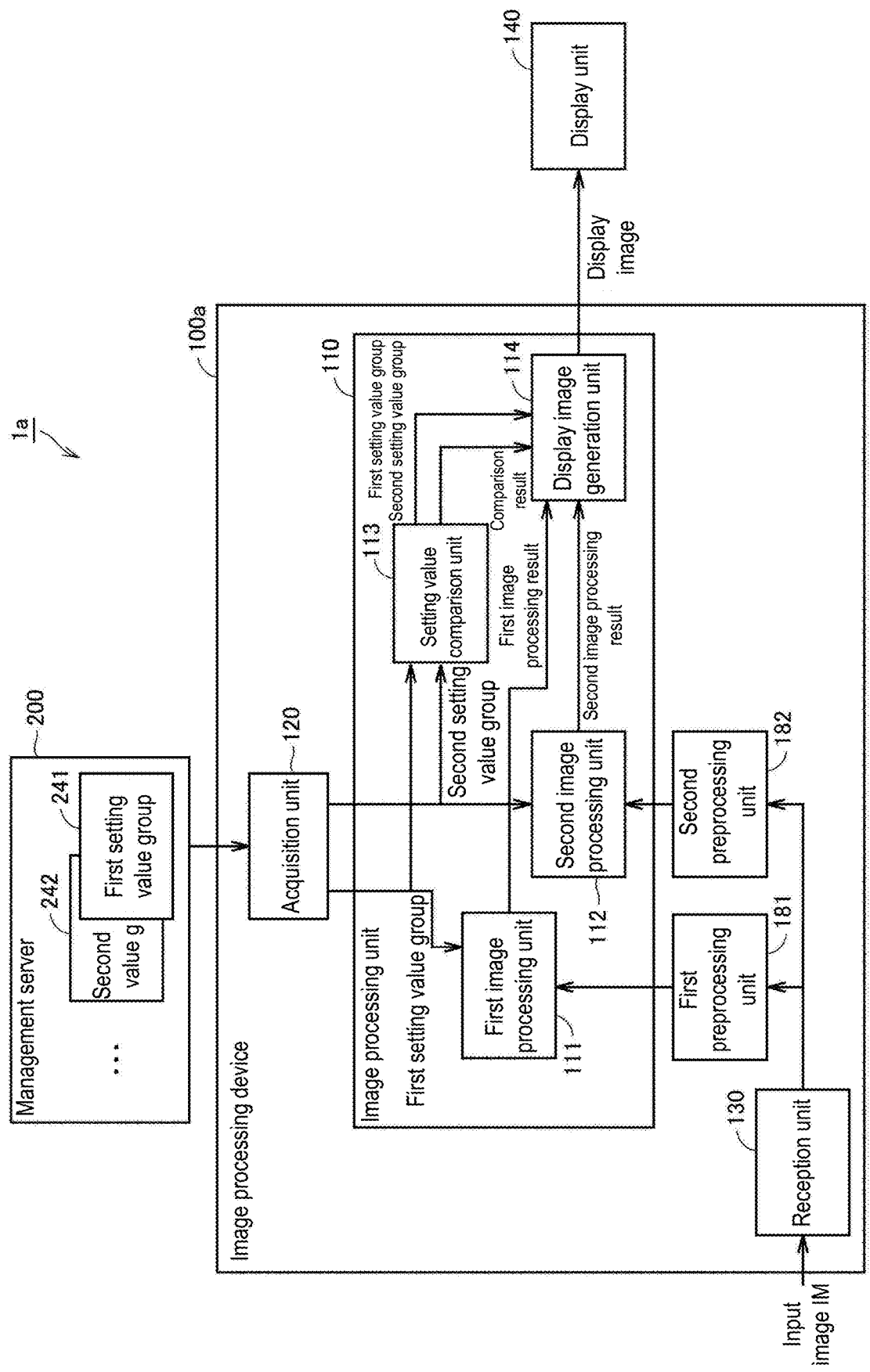
FIG. 13 is a diagram showing a configuration example of the image processing system.

FIG. 13 is a diagram showing a configuration example of an image processing system 1a. In contrast to the image processing device 100 in the embodiment, an image processing device 100a in the present embodiment includes a first preprocessing unit 181 between the reception unit 130 and the first image processing unit 111. In addition, the image processing device 100a includes a second preprocessing unit 182 between the reception unit 130 and the second image processing unit 112.

The first preprocessing unit 181 and the second preprocessing unit 182 execute arbitrary preprocessing on the input image IM received by the reception unit 130. More specifically, the first preprocessing unit 181 and the second preprocessing unit 182 perform preprocessing such as spatial filtering on the input image IM, and output the preprocessed image to the first image processing unit 111 and the second image processing unit 112. The image processing system 1 can remove noise added to the image by filtering the input image IM. Moreover, the preprocessing executed by the first preprocessing unit 181 and the second preprocessing unit 182 may be the same processing or different processing. For example, in the case of the same processing, the setting values in the filtering are the same value, and in the case of different processing, the setting values in the filtering are different values.

Variation Example

In each of the embodiments described above, it is described that the image processing system 1 uses an actual image photographed by the camera 8 to perform the image processing. In contrast, a simulation device may be arranged in the image processing system 1 to perform image processing. More specifically, the simulation device manages a virtual camera arranged in a virtual space and generates a virtual image according to the viewpoint position and the visual field range of the virtual camera. The image processing device 100 uses the generated virtual image as the input image IM and executes image processing to generate the display image 141. Accordingly, the image processing system 1 can compare or change the setting values based on the virtually generated image without photographing an actual image, and can improve user convenience.

In each of the embodiments described above, it is described that the display image generation unit 114 generates, for example, the display image 141 in which the display mode of the setting item having different setting values in the display image 141 is different (for example, highlighted) from the display mode of other setting items. As an example of highlighting, in addition to changing the display color of the setting item to a different color, at least one of blinking of the setting item, change of the font of characters and the like described in the setting item, and change of the color of the characters may be used.

In each of the embodiment described above, the image processing device 100 may perform merge processing which reflects at least one setting value (a setting value corresponding to a certain setting item) in one setting value group 240 to at least one setting value (a setting value corresponding to the same setting item as the above setting item) in another setting value group 240. More specifically, the image processing device 100 may perform merge processing which reflects a setting value corresponding to a setting item associated with certain attribute information (for example, version 1.0) to a setting value corresponding to the same setting item associated with another attribute information (for example, version 2.0).

APPENDIX

As described above, the present embodiment includes the following configurations.

[Configuration 1]

An image processing system (1) for performing image processing on an input image (IM) according to settings, the image processing system (1) comprising:
a management server (200) that holds each setting value group (240) in association with attribute information, the setting value group (240) consisting of a set of setting values being values used for the settings and corresponding to a plurality of setting items; and an image processing device (100) capable of communicating with the management server (200),
wherein the image processing device (100) comprises:
an acquisition unit (120) for acquiring a first setting value group (241) and a second setting value group (242) among a plurality of the setting value groups (240);
a reception unit (130) for receiving the input image (IM);
image processing units (111, 112) for deriving a first image processing result (441) showing the result of performing the image processing on the input image (IM) according to the first setting value group (241) and a second image processing result (442) showing the result of performing the image processing on the input image (IM) according to the second setting value group (242);
a comparison unit (113) for calculating a comparison result obtained by comparing the setting values corresponding to the same setting item among the setting values included in the first setting value group (241) and the setting values included in the second setting value group (242); and
a display image generation unit (114) for generating a display image (141) in which a first display image (141a) including the first setting value group (241) and the first image processing result (441) is associated with a second display image (141b) including the second setting value group (241) and the second image processing result (442); and the display image generation unit (114) generates the display image (141) in which a display mode of at least one of the setting values varying in value according to the comparison result and setting items corresponding to the setting values varying in value according to the comparison result is different from a display mode of others.

[Configuration 2]

An image processing device (100) for performing image processing on an input image (IM) according to settings, the image processing device (100) comprising:
an acquisition unit (120) for acquiring a first setting value group (241) and a second setting value group (242) among a plurality of setting value groups (240) from a management server (200) that holds each setting value group (240) in association with attribute information, the setting value group (240) consisting of a set of setting values being values used for the settings and corresponding to a plurality of setting items; a reception unit (130) for receiving the input image (IM);
image processing units (111, 112) for deriving a first image processing result (441) showing the result of performing the image processing on the input image (IM) according to the first setting value group (241) and a second image processing result (442) showing the result of performing the image processing on the input image (IM) according to the second setting value group (242);
a comparison unit (113) for calculating a comparison result obtained by comparing the setting values corresponding to the same setting item among the setting values included in the first setting value group (241) and the setting values included in the second setting value group (242); and
a display image generation unit (114) for generating a display image (141) in which a first display image (141*a*) including the first setting value group (241) and the first image processing result (441) is associated with a second display image (141*b*) including the second setting value group (242) and the second image processing result (442), wherein the display image generation unit (114) generates the display image (141) in which a display mode of at least one of the setting values varying in value according to the comparison result and setting items corresponding to the setting values varying in value according to the comparison result is different from a display mode of others.

[Configuration 3]
The image processing device according to configuration 2, wherein the display image generation unit (114) generates the display image (141) in which the first display image (141*a*) and the second display image (141*b*) are arranged adjacent to each other on the left and right sides.

[Configuration 4]
The image processing device according to configuration 3, wherein the display image generation unit (114) generates the display image (141) in which the first display image (141*a*) and the second display image (141*b*) are arranged adjacent to each other on the left and right sides; in the first display image (141*a*), the first image processing result (441) is arranged at a position farthest from the second display image (141*b*), the first setting value group (241) is arranged at a position adjacent to the second display image (141*b*), and the setting items (341) are arranged between the first image processing result (441) and the first setting value group (241), and in the second display image (141*b*), the second setting value group (242) is arranged at a position farthest from the first display image (141*a*), the second image processing result (442) is arranged at a position adjacent to the first display image (141*a*), and the setting items (342) are arranged between the second image processing result (442) and the second setting value group (242).

[Configuration 5]
The image processing device according to configuration 3, wherein the display image generation unit (114) generates the display image (141) in which the setting items (341) are arranged at substantially the center of the display image (141*a*), the first setting value group (241) is arranged at a position adjacent to one of the left and right sides with respect to the setting items (341), and the second setting value group (242) is arranged at a position adjacent to the other side.

[Configuration 6]
The image processing device according to configuration 2, wherein the display image generation unit (114) generates the display image (141) in which the first display image (141*a*) is superimposed on the second display image (141*b*).

[Configuration 7]
The image processing device according to any one of configurations 2 to 6, wherein the setting values included in the first setting value group (241) and the setting values included in the second setting value group (242) are changeable.

[Configuration 8]
The image processing device according to configuration 7,
wherein the image processing device further comprises a communication unit (166) for outputting the setting value group (240) to the management server (200), and
the communication unit (166) outputs, to the management server (200), at least one of the first setting value group (241) in which the setting value is changed and the second setting value group (242) in which the setting value is changed.

[Configuration 9]
The image processing device according to any one of configurations 2 to 8, wherein the image processing units (111, 112) derive the first image processing result (441) and the second image processing result (442) by the image processing on the same input image (IM).

[Configuration 10]
The image processing device according to any one of configurations 2 to 9,
wherein the image processing device further comprises a storage device (154) for storing the input image (IM), and
the image processing units (111, 112) perform the image processing on either the input image (IM) photographed in real time by a camera (8) or the input image (IM) stored in the storage device (154).

[Configuration 11]
The image processing device according to any one of configurations 2 to 10, further comprising preprocessing execution units (181, 182) for executing arbitrary preprocessing on at least one of the input image (IM) that has not been subjected to the image processing according to the first setting value group (241) and the input image (IM) that has not been subjected to the image processing according to the second setting value group (242).

[Configuration 12]
An image processing method for performing image processing on an input image (IM) according to settings, the method comprising:
steps (S910, S915) of acquiring a first setting value group (241) and a second setting value group (242) among a plurality of setting value groups (240) from a management server (200) that holds each setting value group in association with attribute information, wherein the setting value group consists of a set of setting values being values used for the settings and corresponding to a plurality of setting items;
a step (S920) of receiving the input image (IM);
steps (S930, S935) of deriving a first image processing result (441) showing the result of performing the image processing on the input image (IM) according to the first setting value group (241) and a second image processing result (442) showing the result of performing the image processing on the input image (IM) according to the second setting value group (242);
a step (S940) of calculating a comparison result obtained by comparing the setting values corresponding to the same setting item among the setting values included in the first setting value group (241) and the setting values included in the second setting value group (242); and a step (S945) of generating a display image (141) in which a first display image (141a) including the first setting value group (241) and the first image processing result (441) is associated with a second display image (141b) including the second setting value group (242) and the second image processing result (442), wherein the step (S945) of generating the display image (141) comprises a step of generating the display image (141) in which a display mode of at least one of the setting values varying in value according to the comparison result and setting items corresponding to the setting values varying in value according to the comparison result is different from a display mode of others.

[Configuration 13]

An image processing program of an image processing device (100) for performing image processing on an input image (IM) according to settings, the image processing program causing a control device (150) arranged in the image processing device (100) to execute: steps (S910, S915) of acquiring a first setting value group (241) and a second setting value group (242) among a plurality of setting value groups (240) from a management server (200) that holds each setting value group (240) in association with attribute information, wherein the setting value group consists of a set of setting values being values used for the settings and corresponding to a plurality of setting items;

a step (S920) of receiving the input image (IM);

steps (S930, S935) of deriving a first image processing result (441) showing the result of performing the image processing on the input image (IM) according to the first setting value group (241) and a second image processing result (442) showing the result of performing the image processing on the input image (IM) according to the second setting value group (242);

a step (S940) of calculating a comparison result obtained by comparing the setting values corresponding to the same setting item among the setting values included in the first setting value group (241) and the setting values included in the second setting value group (242); and a step (S945) of generating a display image (141) in which a first display image (141a) including the first setting value group (241) and the first image processing result (441) is associated with a second display image (141b) including the second setting value group (242) and the second image processing result (442), wherein the step (S945) of generating the display image comprises a step of generating the display image (141) in which a display mode of at least one of the setting values varying in value according to the comparison result and setting items corresponding to the setting values varying in value according to the comparison result is different from a display mode of others.

The embodiments disclosed here should be considered illustrative in all respects and not restrictive. The scope of the present invention is indicated by the appended claims rather than by the foregoing description, and all changes which come within the meaning and range equivalent to that of the claims are intended to be included herein.

What is claimed is:

1. An image processing system for performing image processing on an input image according to settings, the image processing system comprising:

a management server that holds each setting value group in association with attribute information, the setting value group consisting of a set of setting values being values used for the settings and corresponding to a plurality of setting items; and an image processing device capable of communicating with the management server, wherein the image processing device comprises:

an acquisition unit for acquiring a first setting value group and a second setting value group among a plurality of the setting value groups;

a reception unit for receiving the input image;

a processor configured to perform: deriving a first image processing result showing a result of performing the image processing on the input image according to the first setting value group and a second image processing result showing a result of performing the image processing on the input image according to the second setting value group;

calculating a comparison result obtained by comparing the setting values corresponding to a same setting item among the setting values included in the first setting value group and the setting values included in the second setting value group; and generating a display image in which a first display image including the first setting value group and the first image processing result is associated with a second display image including the second setting value group and the second image processing result; and generating the display image in which a display mode of at least one of the setting values varying in value according to the comparison result and setting items corresponding to the setting values varying in value according to the comparison result is different from a display mode of others.

2. An image processing device for performing image processing on an input image according to settings, the image processing device comprising:

an acquisition unit for acquiring a first setting value group and a second setting value group among a plurality of setting value groups from a management server that holds each setting value group in association with attribute information, the setting value group consisting of a set of setting values being values used for the settings and corresponding to a plurality of setting items;

a reception unit for receiving the input image;

a processor configured to perform: deriving a first image processing result showing a result of performing the image processing on the input image according to the first setting value group and a second image processing result showing a result of performing the image processing on the input image according to the second setting value group;

calculating a comparison result obtained by comparing the setting values corresponding to a same setting item among the setting values included in the first setting value group and the setting values included in the second setting value group; and generating a display image in which a first display image including the first setting value group and the first image processing result is associated with a second display image including the second setting value group and the second image processing result, wherein the processor generates the display image in which a display mode of at least one of the setting values varying in value according to the comparison result and setting items corresponding to the setting values varying in value according to the comparison result is different from a display mode of others.

3. The image processing device according to claim 2, wherein the processor generates the display image in which the first display image and the second display image are arranged adjacent to each other on the left and right sides.

4. The image processing device according to claim 3, wherein the the processor generates the display image in which the first display image and the second display image are arranged adjacent to each other on the left and right sides; in the first display image, the first image processing result is arranged at a position farthest from the second display image, the first setting value group is arranged at a position adjacent to the second display image, and the setting items are arranged between the first image processing result and the first setting value group, and in the second display image, the second setting value group is arranged at a position farthest from the first display image, the second image processing result is arranged at a position adjacent to the first display image, and the setting items are arranged between the second image processing result and the second setting value group.

5. The image processing device according to claim 3, wherein the processor generates the display image in which the setting items are arranged at substantially a center of the display image, the first setting value group is arranged at a position adjacent to one of the left and right sides with respect to the setting items, and the second setting value group is arranged at a position adjacent to the other side.

6. The image processing device according to claim 2, wherein the processor generates the display image in which the first display image is superimposed on the second display image.

7. The image processing device according to claim 2, wherein the setting values included in the first setting value group and the setting values included in the second setting value group are changeable.

8. The image processing device according to claim 7, further comprises a communication unit for outputting the setting value group to the management server, and
wherein the communication unit outputs, to the management server, at least one of the first setting value group in which the setting value is changed and the second setting value group in which the setting value is changed.

9. The image processing device according to claim 2, wherein processor derives the first image processing result and the second image processing result by the image processing on a same input image.

10. The image processing device according to claim 2, further comprises a storage device for storing the input image, and
wherein the processor performs the image processing on either the input image photographed in real time by a camera or the input image stored in the storage device.

11. The image processing device according to claim 2, further comprising a preprocessing execution unit for executing arbitrary preprocessing on at least one of the input image that has not been subjected to the image processing according to the first setting value group and the input image that has not been subjected to the image processing according to the second setting value group.

12. An image processing method for performing image processing on an input image according to settings, the method comprising:
acquiring a first setting value group and a second setting value group among a plurality of setting value groups from a management server that holds each setting value group in association with attribute information, wherein the setting value group consists of a set of setting values being values used for the settings and corresponding to a plurality of setting items;
receiving the input image;
deriving a first image processing result showing a result of performing the image processing on the input image according to the first setting value group and a second image processing result showing a result of performing the image processing on the input image according to the second setting value group;
calculating a comparison result obtained by comparing the setting values corresponding to a same setting item among the setting values included in the first setting value group and the setting values included in the second setting value group; and
generating a display image in which a first display image including the first setting value group and the first image processing result is associated with a second display image including the second setting value group and the second image processing result,
wherein generating the display image comprises a step of generating the display image in which a display mode of at least one of the setting values varying in value according to the comparison result and setting items corresponding to the setting values varying in value according to the comparison result is different from a display mode of others.

13. A non-transitory computer readable medium storing an image processing program of an image processing device for performing image processing on an input image according to settings, the image processing program causing a control device arranged in the image processing device to execute:
acquiring a first setting value group and a second setting value group among a plurality of setting value groups from a management server that holds each setting value group in association with attribute information, wherein the setting value group consists of a set of setting values being values used for the settings and corresponding to a plurality of setting items;
receiving the input image;
deriving a first image processing result showing a result of performing the image processing on the input image according to the first setting value group and a second image processing result showing a result of performing the image processing on the input image according to the second setting value group;
calculating a comparison result obtained by comparing the setting values corresponding to a same setting item among the setting values included in the first setting value group and the setting values included in the second setting value group; and
generating a display image in which a first display image including the first setting value group and the first image processing result is associated with a second display image including the second setting value group and the second image processing result,
wherein generating the display image comprises a step of generating the display image in which a display mode of at least one of the setting values varying in value according to the comparison result and setting items corresponding to the setting values varying in value according to the comparison result is different from a display mode of another.

14. The image processing device according to claim 3, wherein the setting values included in the first setting value group and the setting values included in the second setting value group are changeable.

15. The image processing device according to claim 4, wherein the setting values included in the first setting value group and the setting values included in the second setting value group are changeable.

16. The image processing device according to claim 5, wherein the setting values included in the first setting value group and the setting values included in the second setting value group are changeable.

17. The image processing device according to claim 6, wherein the setting values included in the first setting value group and the setting values included in the second setting value group are changeable.

18. The image processing device according to claim 3, wherein the processor derives the first image processing result and the second image processing result by the image processing on a same input image.

19. The image processing device according to claim 4, wherein the processor derives the first image processing result and the second image processing result by the image processing on a same input image.

20. The image processing device according to claim 5, wherein the processor derives the first image processing result and the second image processing result by the image processing on a same input image.

\* \* \* \* \*